United States Patent
Muruganathan et al.

(10) Patent No.: US 12,520,311 B2
(45) Date of Patent: Jan. 6, 2026

(54) SYSTEMS AND METHODS FOR TCI STATE ACTIVATION AND CODEPOINT TO TCI STATE MAPPING

(71) Applicant: Telefonaktiebolaget LM Ericsson (publ), Stockholm (SE)

(72) Inventors: Siva Muruganathan, Stittsville (CA); Helka-Liina Määttänen, Helsinki (FI); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 502 days.

(21) Appl. No.: 17/917,357

(22) PCT Filed: Apr. 9, 2021

(86) PCT No.: PCT/IB2021/052979
§ 371 (c)(1),
(2) Date: Oct. 6, 2022

(87) PCT Pub. No.: WO2021/205409
PCT Pub. Date: Oct. 14, 2021

(65) Prior Publication Data
US 2023/0300835 A1    Sep. 21, 2023

Related U.S. Application Data

(60) Provisional application No. 63/007,746, filed on Apr. 9, 2020.

(51) Int. Cl.
*H04W 72/1273* (2023.01)
*H04B 7/06* (2006.01)
*H04W 72/231* (2023.01)

(52) U.S. Cl.
CPC .... *H04W 72/1273* (2013.01); *H04B 7/06968* (2023.05); *H04W 72/231* (2023.01)

(58) Field of Classification Search
CPC .................. H04W 72/1273; H04W 72/231
See application file for complete search history.

(56) References Cited

U.S. PATENT DOCUMENTS

2020/0100154 A1*  3/2020  Cirik ............... H04W 36/0072
2020/0106645 A1    4/2020  Tsai et al.
(Continued)

FOREIGN PATENT DOCUMENTS

| CN | 109587793 A | 4/2019 |
| CN | 110035542 A | 7/2019 |
| CN | 110474724 A | 11/2019 |

OTHER PUBLICATIONS

Notification to Grant for Chinese Patent Application No. 202180041466.4, mailed Jun. 25, 2024, 11 pages.
(Continued)

*Primary Examiner* — Michael Thier
*Assistant Examiner* — Tracy Lauren Raimondo
(74) *Attorney, Agent, or Firm* — Withrow & Terranova, PLLC

(57) ABSTRACT

Systems and methods for TCI state activation and codepoint to TCI state mapping are provided. A method performed by a wireless device for activating TCI states includes one or more of: being configured to monitor a plurality of DCI formats with the TCI field for PDSCH reception; receiving a single MAC CE to activate TCI states and map activated TCI states to the TCI field codepoints of the DCI formats; and receiving separate MAC CEs to activate TCI states and map activated TCI states to the TCI field codepoints of each of the plurality of DCI formats. As such, TCI states for downlink scheduling can be more flexibly chosen for each DCI format by using separate MAC CEs. Additionally, default TCI state definitions might be provided when state activation and state to TCI field codepoint mapping to (Continued)

multiple DCI formats are provided by either a single or different MAC CEs.

24 Claims, 25 Drawing Sheets

(56) References Cited

U.S. PATENT DOCUMENTS

| | | | | |
|---|---|---|---|---|
| 2020/0229161 | A1* | 7/2020 | Raghavan | H04W 24/10 |
| 2020/0351892 | A1* | 11/2020 | Yi | H04L 5/0092 |
| 2022/0131583 | A1* | 4/2022 | Lee | H04B 7/0643 |
| 2022/0167322 | A1* | 5/2022 | Takahashi | H04B 7/0874 |
| 2022/0322410 | A1* | 10/2022 | Matsumura | H04W 72/1273 |
| 2022/0337300 | A1* | 10/2022 | Yuk | H04W 72/54 |

OTHER PUBLICATIONS

Notice of Reasons for Refusal for Japanese Patent Application No. 2022-561643, mailed Jun. 10, 2024, 5 pages.
Ericsson, "R1-1911945: PDCCH Enhancements for NR URLLC," 3GPP TSG-RAN WG1 Meeting #99, Nov. 18-22, 2019, Reno, Nevada, 29 pages.
Ericsson, "R2-2001126: Remaining update for PDSCH TCI state MAC CE," 3GPP TSG-RAN WG2 Meeting #109, Feb. 24-Mar. 6, 2020, Electronic Meeting, 5 pages.
ZTE, "R1-1911963: On PDCCH enhancements for NR URLLC," 3GPP TSG RAN WG1 #99, Nov. 18-22, 2019, Reno, Nevada, 15 pages.
Examination Report No. 1 for Australian Patent Application No. 2021251496, mailed Jun. 9, 2023, 2 pages.
Notice of Reasons for Refusal for Japanese Patent Application No. 2022-561643, mailed Oct. 6, 2023, 4 pages.
Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.
Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR; Medium Access Control (MAC) protocol specification (Release 16)," Technical Specification 38.321, Version 16.0.0, Mar. 2020, 3GPP Organizational Partners, 141 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
Author Unknown, "Technical Specification Group Radio Access Network; Solutions for NR to support non-terrestrial networks (NTN) (Release 16)," Technical Specification 38.821, Version 16.0.0, Dec. 2019, 3GPP Organizational Partners, 140 pages.
Ericsson, "R2-2003345: On DCI format 1_2 applicability to NR eMIMO," 3GPP TSG-RAN WG2 #109bis, Apr. 20-30, 2020, Electronic meeting, 10 pages.
Huawei, et al., "R1-1903981: Single PDCCH based multi-TRP/panel transmission," 3GPP TSG RAN WG1 Meeting #96bis, Apr. 8-12, 2019, Xi'an, China, 4 pages.
Nokia, et al., "R1-1910915: Enhancements on Multi-TRP/Panel Transmission," 3GPP TSG RAN WG1 #98bis Meeting, Oct. 14-20, 2019, Chongqing, China, 25 pages.
Invitation to Pay Additional Fees and Partial Search for International Patent Application No. PCT/IB2021/052979, mailed Jul. 9, 2022, 65 pages.
International Search Report and Written Opinion for International Patent Application No. PCT/IB2021/052979, mailed Sep. 8, 2021, 70 pages.
International Preliminary Report on Patentability for International Patent Application No. PCT/IB2021/052979, mailed Feb. 22, 2022, 25 pages.
Huawei, "R1-2001404: Summary of email discussion [100e-NR-L1enh_URLLC_PDCCH-01] on remaining issues on DCI format," 3GPP TSG RAN WG1 Meeting #100-e, Feb. 24-Mar. 6, 2020, Electronic Meeting, 46 pages.
ZTE, "R2-1913049: Consideration on Enhancement of TCI-State MAC CE for Multi-TRP Transmission," 3GPP TSG RAN WG2 Meeting #107bis, Oct. 14-18, 2019, Congqing, China, 7 pages.
Examination Report for European Patent Application No. 21719726.8, mailed Mar. 4, 2024, 12 pages.
Huawei, et al., "R2-1910915: Avoiding release and add for SN terminated bearers at SN release," 3GPP TSG-RAN WG2 Meeting #106, Aug. 26-30, 2019, Prague, Czech Republic, 7 pages.
Examination Report for Indian Patent Application No. 202247063061, mailed May 17, 2024, 9 pages.
VIVO, "R1-2000333: Discussion on remaining issues on M-TRP and text proposals," 3GPP TSG RAN WG1 #100, Feb. 24-Mar. 6, 2020, Electronic Meeting, 17 pages.
Examination Report No. 2 for Australian Patent Application No. 2021251496, mailed May 29, 2024, 4 pages.
Notice of Preliminary Rejection for Korean Patent Application No. 2022-7037295, mailed Jan. 24, 2025, 10 pages.
Examination Report No. 1 for Australian Patent Application No. 2024203797, mailed Mar. 3, 2025, 4 pages.
Intention to Grant for European Patent Application No. 21719726.8, mailed Apr. 8, 2025, 7 pages.

* cited by examiner

| CODEPOINT OF TCI FIELD IN DCI | TCI STATE ID |
|---|---|
| 0 | 1 |
| 1 | 2, 3 ← DEFAULT TCI STATES GIVEN BY THE TCI STATES WITH IDS 2 AND 3 |
| 2 | 4 |
| 3 | 5, 6 |
| 4 | 7 |
| 5 | 8 |
| 6 | 2, 6 |
| 7 | 5, 3 |

FIG. 16

| Codepoint of TCI field in DCI | TCI State ID |
|---|---|
| 0 | 1 |
| 1 | 2, 3 |
| 2 | 4 |
| 3 | 5, 6 |
| 4 | 7 |
| 5 | 8 |
| 6 | 2, 6 |
| 7 | 5, 3 |

Codepoints 0–3: TCI STATES ACTIVATED AND MAPPED TO TCI FIELD CODEPOINTS OF DCI FORMAT 1_2

Codepoints 4–7: TCI STATES ACTIVATED AND MAPPED TO TCI FIELD CODEPOINTS OF DCI FORMAT 1_1

*FIG. 20*

SYSTEMS AND METHODS FOR TCI STATE ACTIVATION AND CODEPOINT TO TCI STATE MAPPING

RELATED APPLICATIONS

This application is a 35 U.S.C. § 371 national phase filing of International Application No. PCT/IB2021/052979, filed Apr. 9, 2021, which claims the benefit of provisional patent application Ser. No. 63/007,746, filed Apr. 9, 2020, disclosures of which are hereby incorporated herein by reference in their entireties.

TECHNICAL FIELD

This closure relates to Transmission Configuration Indicator (TCI) state activation and codepoint to TCI state mapping.

BACKGROUND

The new generation mobile wireless communication system (5G) or new radio (NR) supports a diverse set of use cases and a diverse set of deployment scenarios.

NR uses CP-OFDM (Cyclic Prefix Orthogonal Frequency Division Multiplexing) in the downlink (i.e., from a network node, gNB, eNB, or base station, to a user equipment or UE) and both CP-OFDM and discrete Fourier Transform Spread Orthogonal Frequency Division Multiplexing (DFT-S-OFDM) in the uplink (i.e., from User Equipment (UE) to New Radio Base Station (gNB)). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe, and each slot always consists of 14 OFDM symbols, irrespectively of the subcarrier spacing.

FIG. 1 illustrates NR time-domain structure with 15 kHz subcarrier spacing, according to some embodiments. Typical data scheduling in NR are per slot basis, an example is shown in FIG. 1 where the first two symbols contain Physical Downlink Control Channel (PDCCH) and the remaining 12 symbols contains Physical Data Channel (PDCH), either a Physical Downlink Data Channel (PDSCH) or Physical Uplink Data Channel (PUSCH).

Different subcarrier spacing values are supported in NR. The supported subcarrier spacing values (also referred to as different numerologies) are given by $\Delta f=(15 \times 2^a)$ kHz where a is a non-negative integer. $\Delta f=15$ kHz is the basic subcarrier spacing that is also used in LTE. The slot durations at different subcarrier spacings are shown in the table below:

| Slot length at different numerologies. | | |
|---|---|---|
| Numerology | Slot length | RB BW |
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

In the frequency domain physical resource definition, a system bandwidth is divided into Resource Blocks (RBs); each corresponds to 12 contiguous subcarriers. The Common RBs (CRB) are numbered starting with 0 from one end of the system bandwidth. The UE is configured with one or up to four bandwidth part (BWPs) which may be a subset of the RBs supported on a carrier. Hence, a BWP may start at a CRB larger than zero. All configured BWPs have a common reference, the CRB 0. Hence, a UE can be configured a narrow BWP (e.g., 10 MHz) and a wide BWP (e.g., 100 MHz), but only one BWP can be active for the UE at a given point in time. The Physical Resource Block (PRB) are numbered from 0 to N−1 within a BWP (but the 0:th PRB may thus be the K:th CRB where K>0).

The basic NR physical time-frequency resource grid is illustrated in FIG. 2, where only one Resource Block (RB) within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. A UE first detects and decodes PDCCH and the decoding is successfully, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

There currently exist certain challenges. For DCI format 1_1, when the TCI field is enabled, the TCI field in DCI format 1_1 is always 3 bits (i.e., 8 codepoints). So, the number of TCI field codepoints in DCI format 1_1 does not change when TCI field is enabled in different CORESETs.

Therefore, improvements for TCI state activation and codepoint to TCI state mapping are needed.

SUMMARY

Systems and methods for Transmission Configuration Indicator (TCI) state activation and codepoint to TCI state mapping are provided. In some embodiments, a method performed by a wireless device for activating TCI states includes one or more of: being configured to monitor a plurality of Downlink Control Information (DCI) formats with the TCI field for Physical Downlink Shared Channel (PDSCH) reception; receiving a single Medium Access Control (MAC) Control Element (CE) to activate TCI states and map activated TCI states to the TCI field codepoints of the plurality of DCI formats; and receiving separate MAC CEs to activate TCI states and map activated TCI states to the TCI field codepoints of each of the plurality of DCI formats. In some embodiments, one or more of the plurality of DCI formats are DCI format 1_1 and/or 1_2. Benefits might include that the TCI states for downlink scheduling can be more flexibly chosen for each DCI format by using separate MAC CEs. For instance, DCI format 1_2 may be used to schedule URLLC data in downlink with one set of TCI states (e.g., one set of beams), and DCI format 1_1 may be used to schedule enhanced Mobile Broadband (eMBB) data in the downlink with another set of TCI states (e.g., a second set of beams).

In some embodiments, a method performed by a base station for activating TCI states includes one or more of: configuring a wireless device to monitor a plurality of DCI formats with the TCI field for PDSCH reception; transmitting, to the wireless device, a single MAC CE to activate TCI states and map activated TCI states to the TCI field codepoints of the plurality of DCI formats; and transmitting, to the wireless device, separate MAC CEs to activate TCI states and map activated TCI states to the TCI field codepoints of each of the plurality of DCI formats.

In some embodiments, when the number of codepoints S in the TCI field of a DCI is less than the maximum number of codepoints in the MAC CE activation command, the S codepoints are mapped to the first S codepoints in the MAC CE activation command.

In some embodiments, when a single activation command is used for TCI state activation/deactivation for both DCI formats 1_1 and 1_2, the default TCI states are the TCI states corresponding to the lowest codepoint, among the TCI codepoints contained in the MAC CE activation command, containing two different TCI states.

Methods for determining mapping between a codepoint and one or more TCI state for DCI format 1_2 are proposed, including one or more of:

Sharing a same MAC CE activation command with DCI format 1_1 and using the mapping for a first S codepoints in the activation command to activate and map TCI states to the codepoints for DCI format 1_2, where S is the number of codepoints configured for DCI format 1_2 in a CORESET; and/or Sharing a same MAC CE activation command with DCI format 1_1 and using the mapping for S consecutive codepoints in the activation command, starting from a configured offset value;

Using a separate MAC CE activation command for DCI format 1_2.

Furthermore, determining default TCI states for both single shared and separate MAC CE activation cases are also proposed.

There are, proposed herein, various embodiments which address one or more of the issues closed herein. In some embodiments, one or more of the plurality of DCI formats are DCI format 1_1 and/or 1_2. In some embodiments, using a single MAC CE to activate TCI states and map activated TCI states to the TCI field codepoints of the plurality of DCI formats comprises using the mappings for a subset of TCI field codepoints in one DCI format to the TCI field codepoints in another DCI format. In some embodiments, the activated TCI states mapped to the first S TCI field codepoints in DCI format 1_1 are mapped to the TCI field codepoints in DCI format 1_2, wherein S is, e.g., the number of codepoints in the TCI field of DCI format 1_2. In some embodiments, the activated TCI states mapped to TCI field codepoints $S_0+1$ to $S_0+S$ in DCI format 1_1 are mapped to the TCI field codepoints in DCI format 1_2, wherein S is, e.g., the number of codepoints in the TCI field of DCI format 1_2 and $S_0$ is, e.g., either a pre-specified, fixed, or configurable value.

In some embodiments, S is determined from the higher layer parameter tci-PresentInDCI-ForDCI-Format1-2 as S=2 K where K can take on one value out of 1, 2, or 3 as configured by tci-PresentInDCI-ForDCI-Format1-2.

In some embodiments, using a single MAC CE to activate TCI states and map activated TCI states to the TCI field codepoints of the plurality of DCI formats includes one or more of: receiving TCI state mappings to a large number of codepoints than the number of codepoints in any of the plurality of DCI formats in the single MAC CE; using the mappings of a first subset of TCI field codepoints in the MAC CE to the TCI field codepoints of a first DCI format, and using the mappings of a second subset of TCI field codepoints in the MAC CE to the TCI field codepoints of a second DCI format.

In some embodiments, using a single MAC CE to activate TCI states and map activated TCI states to the TCI field codepoints of the plurality of DCI formats includes using a field in the MAC CE to indicate which DCI format among the plurality of DCI formats to which the TCI codepoint mapping applies to.

In some embodiments, using different MAC CEs to activate TCI states and map activated TCI states to the TCI field codepoints of the plurality of DCI formats.

In some embodiments, the default TCI state is defined as the TCI states corresponding to the lowest codepoint, among the TCI codepoints contained in the MAC CE, containing two different TCI states.

In some embodiments, the default TCI state is defined as the TCI states corresponding to the lowest codepoint, among the TCI codepoints contained in one of the different MAC CEs, containing two different TCI states.

Certain embodiments may provide one or more of the following technical advantage(s). In this way, benefits of some embodiments might include that a single MAC CE can be used to provide the TCI state activation and TCI state to TCI field codepoint mapping to multiple downlink DCI formats which avoids the need for introducing separate MAC CEs for each downlink DCI format.

There are also benefits associated with some other embodiments using different MAC CEs to provide the TCI state activation and TCI state to TCI field codepoint mapping to multiple downlink DCI formats. The benefits might include that the TCI states for downlink scheduling can be more flexibly chosen for each DCI format by using separate MAC CEs. For instance, DCI format 1_2 may be used to schedule URLLC data in downlink with one set of TCI states (e.g., one set of beams), and DCI format 1_1 may be used to schedule eMBB data in the downlink with another set of TCI states (e.g., a second set of beams).

Another benefit of the proposed solution might be that it provides the default TCI state definitions when the TCI state activation and TCI state to TCI field codepoint mapping to multiple downlink DCI formats are provided by either a single MAC CE or different MAC CEs.

BRIEF DESCRIPTION OF THE DRAWINGS

The accompanying drawing figures incorporated in and forming a part of this specification illustrate several aspects of the closure, and together with the description serve to explain the principles of the closure.

FIG. 16 shows an example of the default TCI states for a given Codepoint of TCI field to TCI state mapping according to some other embodiments of the present closure;

FIG. 20 illustrates an example showing a subset of the activated TCI states mapped to the TCI field in DCI format 1_1 being mapped to the codepoints of TCI field in DCI format 1_2, according to some embodiments;

DETAILED DESCRIPTION

Figure 1:
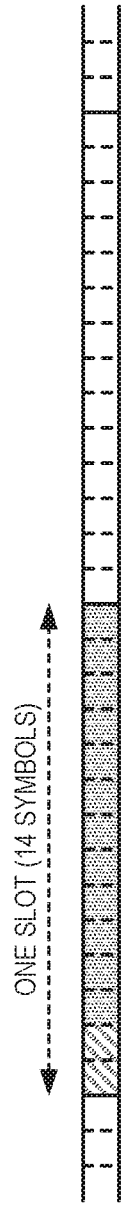
FIG. 1 illustrates NR time-domain structure with 15 kHz subcarrier spacing, according to some embodiments, according to some other embodiments of the present closure.
Figure 2:
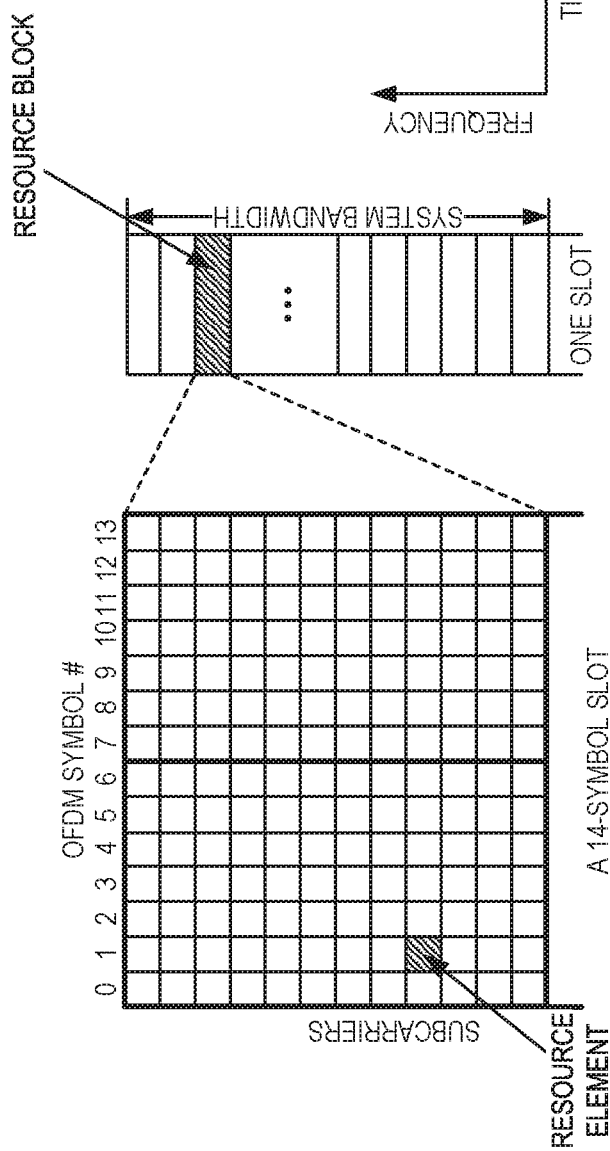
FIG. 2 illustrates the basic NR physical time-frequency resource grid, according to some other embodiments of the present closure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the closure and will recognize applications of these concepts not particularly addressed herein. It should be understood that these concepts and applications fall within the scope of the closure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB tributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts closed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
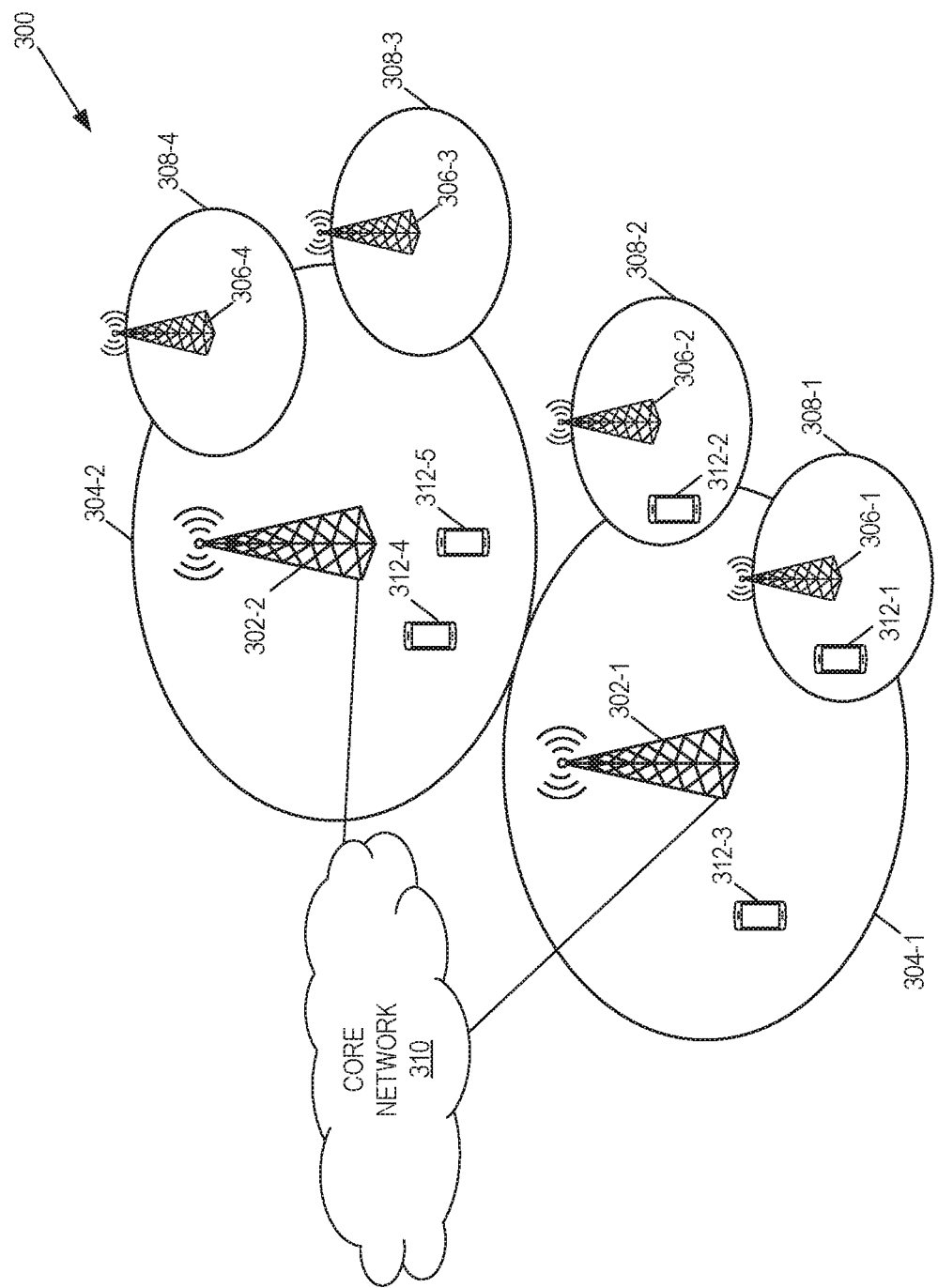
FIG. 3 illustrates one example of a cellular communications system in which embodiments of the present closure may be implemented.

FIG. 3 illustrates one example of a cellular communications system 300 in which embodiments of the present closure may be implemented. In the embodiments described herein, the cellular communications system 300 is a 5G System (5GS) including a NR RAN or LTE RAN (i.e., Evolved Universal Terrestrial Radio Access (E-UTRA) RAN) or an Evolved Packet System (EPS) including a LTE RAN. In this example, the RAN includes base stations 302-1 and 302-2, which in 5G NR are referred to as gNBs (e.g., LTE RAN nodes connected to 5G Core (5GC), which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G Core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present closure is not limited thereto.

QCL and TCI States

Several signals can be transmitted from the same base station antenna from different antenna ports. These signals can have the same large-scale properties, for instance in terms of Doppler shift/spread, average delay spread, or average delay, when measured at the receiver. These antenna ports are then said to be Quasi Co-Located (QCL).

The network can then signal to the UE that two antenna ports are QCL. If the UE knows that two antenna ports are QCL with respect to a certain parameter (e.g., Doppler spread), the UE can estimate that parameter based on a reference signal transmitted one of the antenna ports and use that estimate when receiving another reference signal or physical channel the other antenna port. Typically, the first antenna port is represented by a measurement reference signal such as Channel State Information Reference Signal (CSI-RS) (known as source RS) and the second antenna port is a demodulation reference signal (DMRS) (known as target RS) for PDSCH or PDCCH reception.

For instance, if antenna ports A and B are QCL with respect to average delay, the UE can estimate the average delay from the signal received from antenna port A (known as the source Reference Signal (RS)) and assume that the signal received from antenna port B (target RS) has the same average delay. This is useful for demodulation since the UE can know beforehand the properties of the channel when trying to measure the channel utilizing the DMRS, which may help the UE in for instance selecting an appropriate channel estimation filter.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that uses analog beamforming to receive signals, since the UE needs to adjust its RX beam in some direction prior to receiving a certain signal. If the UE knows that the signal is spatially QCL with some other signal it has received earlier, then it can safely use the same RX beam to receive also this signal. Note that for beam management, the cushion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for tracking or Tracking Reference Signal (TRS) for time/frequency offset estimation. To be able to use any QCL reference, the UE would have to receive it with a sufficiently good SINR. In many cases, this means that the TRS has to be transmitted in a suitable beam to a certain UE.

To introduce dynamics in beam and transmission point (TRP) selection, the UE can be configured through Radio Resource control (RRC) signaling with M TCI (Transmission Configuration Indication) states, where M is up to 128 in Frequency Range 2 (FR2) for the purpose of PDSCH reception and up to 8 in FR1, depending on UE capability.

Each TCI state contains QCL information, i.e., one or two source DL RSs, each source RS associated with a QCL type. For example, a TCI state contains a pair of reference signals, each associated with a QCL type, e-g- two different CSI-RSs {CSI-RS1, CSI-RS2} is configured in the TCI state as {qcl-Type1,qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

Each of the M states in the list of TCI states can be interpreted as a list of M possible beams transmitted from the network or a list of M possible TRPs used by the network to communicate with the UE. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via Medium Access Control (MAC) Control Element (CE) one TCI state for PDCCH (i.e., provides a TCI for PDCCH) and up to eight active TCI states for PDSCH. The number of active TCI states the UE support is a UE capability but the maximum is eight.

Each configured TCI state contains parameters for the quasi co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with 8 active TCI states (from a list of totally 64 configured TCI states). Hence, 56 TCI states are inactive for this particular UE (but some may be active for another UE) and the UE need not be prepared to have large scale parameters estimated for those. But the UE continuously tracks and updates the large scale parameters for the 8 active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation.

DMRS

Demodulation reference signals are used for coherent demodulation of physical layer data channels, PDSCH (DL) and PUSCH (UL), as well as of physical layer downlink control channel PDCCH. The DM-RS is confined to resource blocks carrying the associated physical layer channel and is mapped on allocated resource elements of the OFDM time-frequency grid such that the receiver can efficiently handle time/frequency-selective fading radio channels.

The mapping of DM-RS to resource elements is configurable in terms of density both frequency and time domain, with two mapping types in the frequency domain (configuration type 1 or type 2) and two mapping types in the time domain (mapping type A or type B) defining the symbol position of the first DM-RS within a transmission interval. The DM-RS mapping in time domain can further be single-symbol based or double-symbol based where the latter means that DM-RS is mapped in pairs of two adjacent symbols. Furthermore, a UE can be configured with one, two, three or four single-symbol DM-RS and one or two double-symbol DM-RS. In scenarios with low Doppler, it may be sufficient to configure front-loaded DM-RS only, i.e., one single-symbol DM-RS or one double-symbol DM-RS, whereas in scenarios with high Doppler additional DM-RS will be required.

Figure 4:
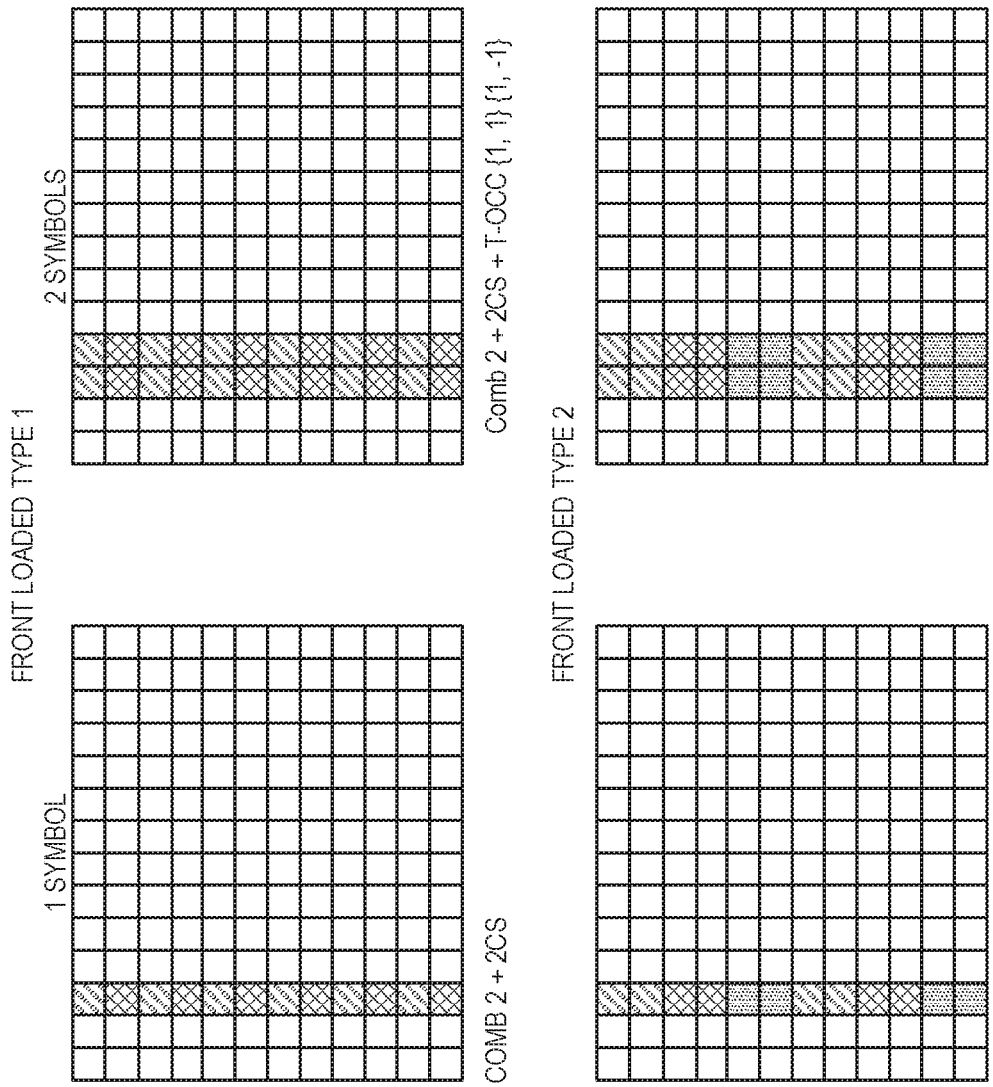
FIG. 4 shows the mapping of front-loaded DM-RS for configuration type 1 and type 2 with single-symbol and double-symbol DM-RS and for the mapping type A with first DM-RS in third symbol of a transmission interval of 14 symbols, according to some other embodiments of the present closure.

FIG. 4 shows the mapping of front-loaded DM-RS for configuration type 1 and type 2 with single-symbol and double-symbol DM-RS and for the mapping type A with first DM-RS in third symbol of a transmission interval of 14 symbols. In this figure, Type 1 and Type 2 differs with respect to both the mapping structure and the number of supported DM-RS CDM groups where Type 1 support 2 CDM groups and Type 2 support three CDM groups. CDM groups indicated by shading.

PDSCH Transmission Over Multiple Transmission Points or Panels (TRP)

In one scenario, downlink data are transmitted over multiple TRPs in which different MIMO layers are transmitted over different TRPs. This is referred to a Non-coherent Joint Transmission (NC-JT). In another scenario, different time/frequency resources may be allocated to different TRPs and one or multiple PDSCH is transmitted over different TRPs. Two ways of scheduling multi-TRP transmission are specified in NR Rel-16: multi-PDCCH based multi-TRP transmission and single-PDCCH based multi-TRP transmission. The multi-PDCCH based multi-TRP transmission and single-PDCCH based multi-TRP transmission can be used to serve downlink enhanced Mobile Broadband (eMBB) traffic as well as downlink URLLC traffic to the UE.

Multi-PDCCH Based DL Data Transmission Over Multiple Transmission Points (TRP)

Figure 5:
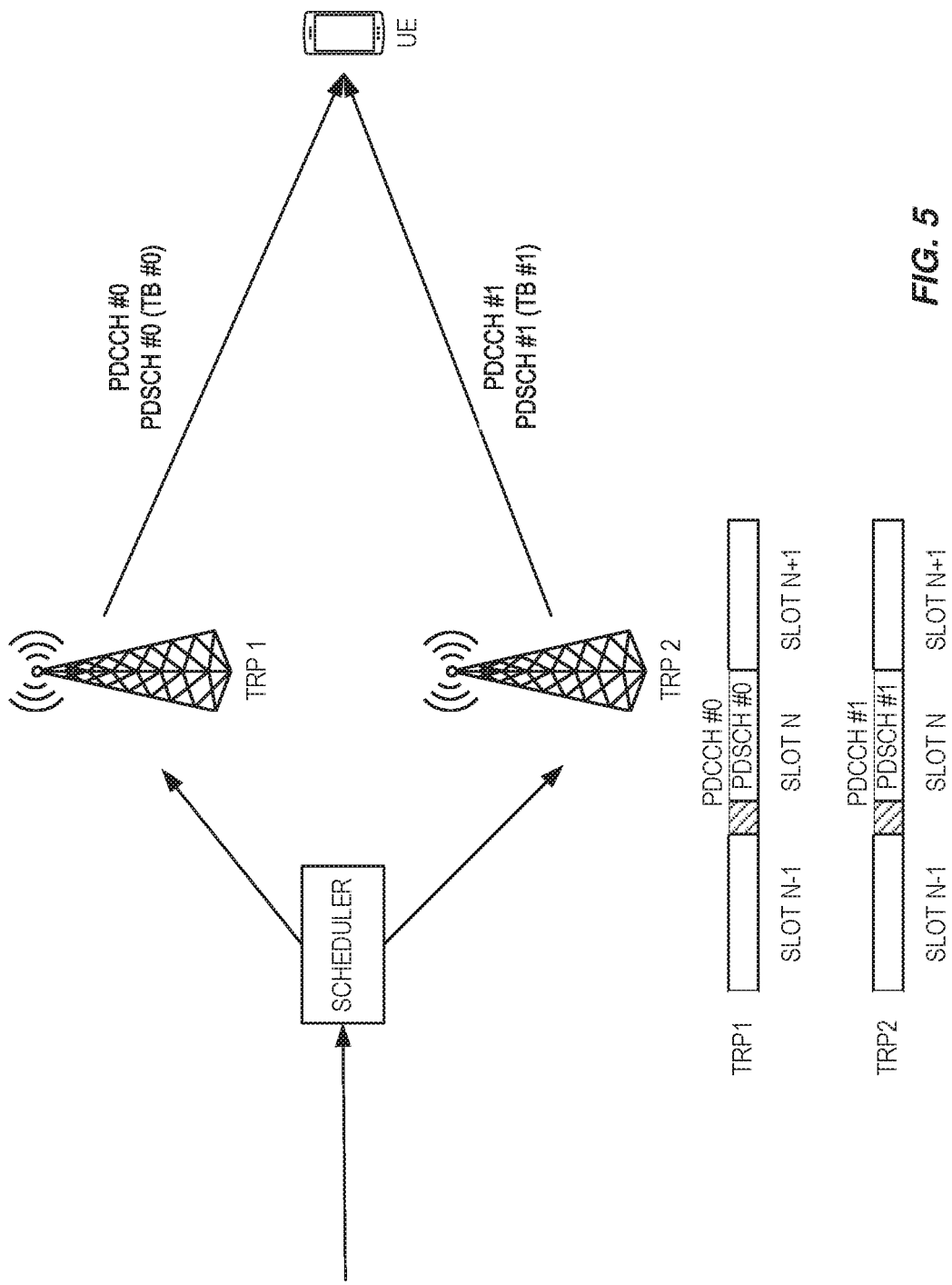
FIG. 5 illustrates an example of multi-PDCCH based multi-TRP transmission with a single scheduler, according to some embodiments.

FIG. 5 illustrates an example of multi-PDCCH based multi-TRP transmission with a single scheduler, according to some embodiments. An example is shown in FIG. 5, where data are sent to a UE over two TRPs, each TRP carrying one TB mapped to one code word. When the UE has four receive antennas while each of the TRPs has only two transmit antennas, the UE can support up to four MIMO layers but each TRP can maximally transmit two MIMO layers. In this case, by transmitting data over two TRPs to the UE, the peak data rate to the UE can be increased as up to four aggregated layers from the two TRPs can be used.

This is beneficial when the traffic load and thus the resource utilization, is low in each TRP. In this example, a single scheduler is used to schedule data over the two TRPs. One PDCCH is transmitted from each of the two TRPs in a slot, each schedule one PDSCH. This is referred to as a multi-PDCCH or multi-DCI scheme in which a UE receives two PDCCHs and the associated two PDSCHs in a slot from two TRPs.

Figure 6:
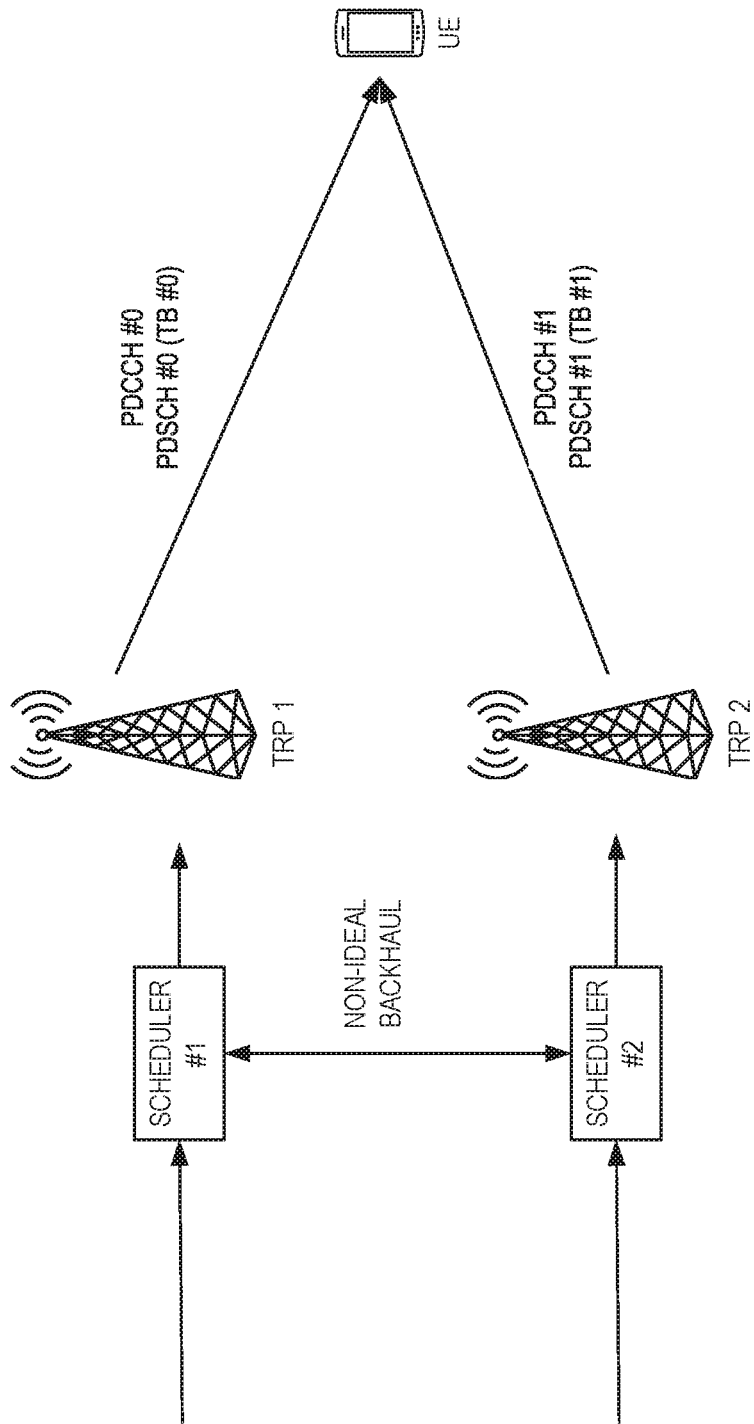
FIG. 6 illustrates an example of multi-PDCCH based multi-TRP transmission with independent schedulers, according to some embodiments.

FIG. 6 illustrates an example of multi-PDCCH based multi-TRP transmission with independent schedulers, according to some embodiments. In another scenario shown in FIG. 6, independent schedulers are used in each TRP. In this case, only slow coordination between the two schedulers can be done due the non-ideal backhaul, i.e., backhaul with large delay and/or delay variations which are comparable to the cyclic prefix length or in some cases even longer, up to several milliseconds.

In NR specification 3GPP TS 38.211, there is a restriction stating:

"The UE may assume that the PDSCH DM-RS within the same CDM group are quasi co-located with respect to Doppler shift, Doppler spread, average delay, delay spread, and spatial Rx."

In cases where a UE is not scheduled with all DMRS ports within a CDM group, there may be another UE simultaneously scheduled, using the remaining ports of that CDM group. The UE can then estimate the channel for that other UE (thus an interfering signal) in order to perform coherent interference suppression. Hence, this is useful in MU-MIMO scheduling and UE interference suppression.

Figure 7:
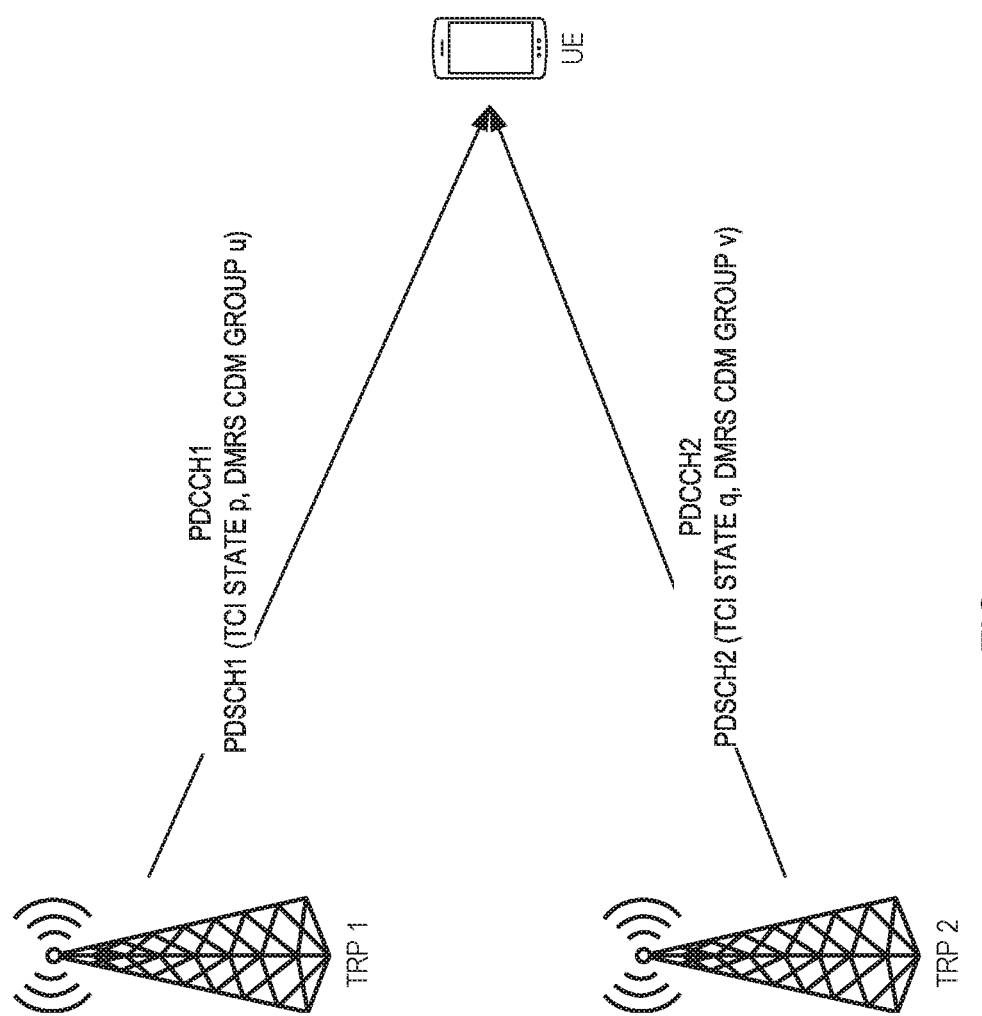
FIG. 7 illustrates an example illustrating relationship between TCI states and DM-RS CDM groups in a scenario in which UE receives PDSCHs via multiple PDCCHs transmitted from different TRPs, according to some embodiments.

In case of a multi-TRP scenario, in which the UE receives PDSCHs via multiple PDCCHs transmitted from different TRPs, the signals transmitted from different TRPs will most likely not be quasi-collocated as the TRPs may be spatially separated. In this case, the PDSCHs transmitted from different TRPs will have different TCI states associated with them. Furthermore, according to the above restriction from 3GPP TS 38.211, two PDSCH DM-RSs associated with two TRPs will have to belong to different DM-RS CDM groups (as the two PDSCH DM-RSs are not QCL, they cannot belong to the same DM-RS CDM group). FIG. 7 illustrates an example illustrating relationship between TCI states and DM-RS CDM groups in a scenario in which UE receives PDSCHs via multiple PDCCHs transmitted from different TRPs, according to some embodiments. FIG. 7 illustrates an example relationship between TCI states and DM-RS CDM groups for a multiple-PDCCH multi-TRP scenario. In the example, PDSCH1 is associated with TCI State p, and PDSCH 2 is associated with TCI state q. The PDSCH DM-RSs from the different TRPs also belong to different DM-RS CDM groups as they are not quasi-collocated. In the example, the DMRS for PDSCH1 belongs to CDM group a while the DMRS for PDSCH2 belongs to CDM group v.

Figure 8:
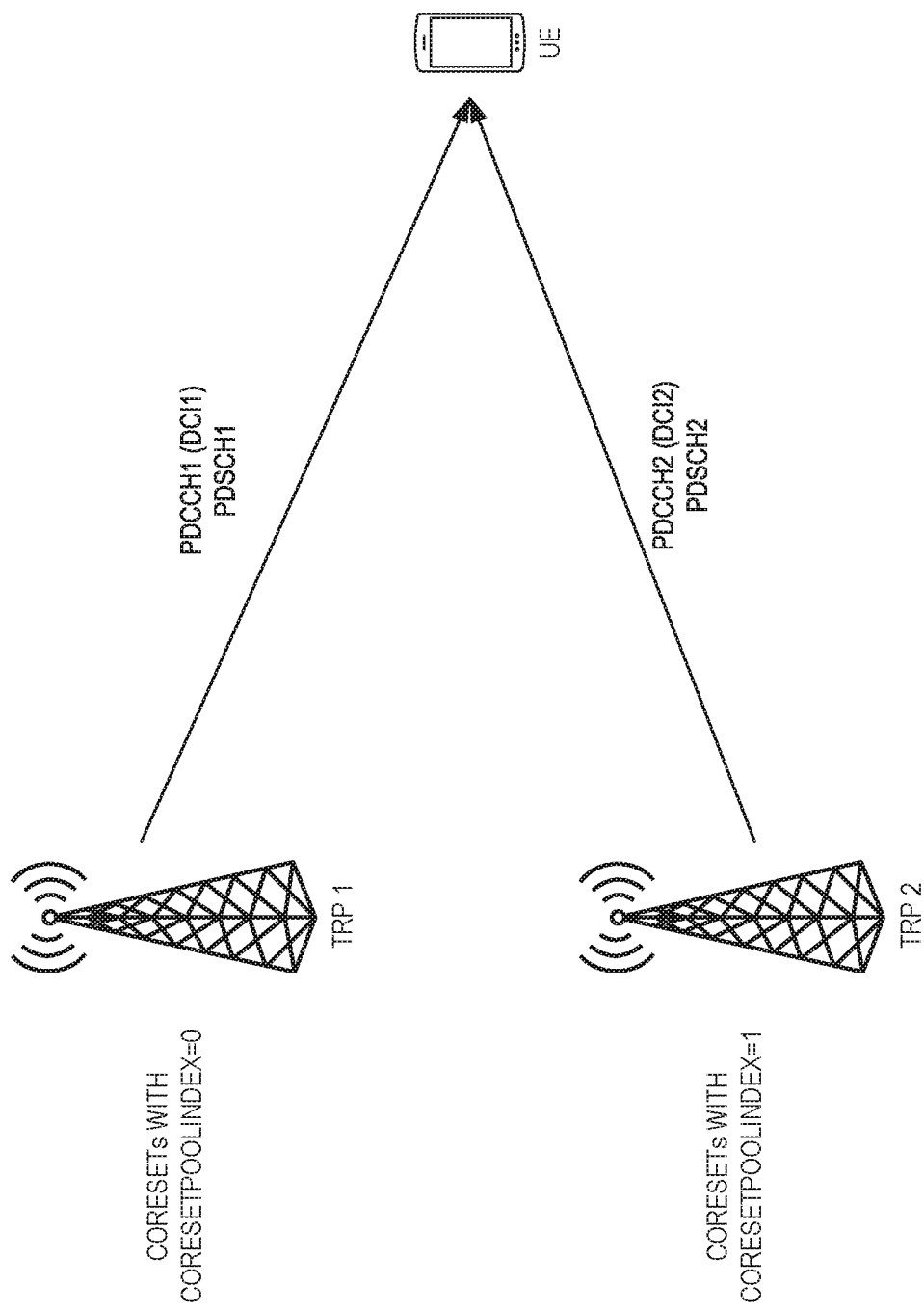
FIG. 8 illustrates an example where PDSCH 1 is scheduled by PDCCH 1 from TRP1 and PDSCH 2 is scheduled by PDCCH 2 from TRP2, according to some other embodiments of the present closure.

For multi-PDCCH based multi-TRP operation, a UE needs to be configured with two CORESET pools, each associated with a TRP. Each CORESET pool is a collection of CORESETs that belongs to the same pool. A CORESET pool index can be configured in each CORESET with a value of 0 or 1. An example is shown FIG. 8, where PDSCH 1 is scheduled by PDCCH 1 from TRP1 and PDSCH 2 is scheduled by PDCCH 2 from TRP2. The two PDSCHs may be fully, partially or non-overlapping in time and frequency. For the two DCIs in the example of FIG. 8, they are transmitted in two CORESETs belonging to different CORESET pools (i.e., DCIs 1 and 2 are transmitted in separate CORESETs belonging to CORESETPoolIndex 0 and 1, respectively).

Figure 9:
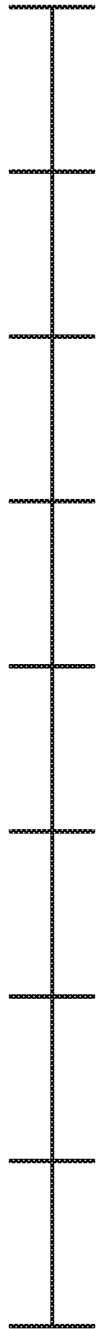
FIG. 9 illustrates TCI States Activation/Deactivation PDSCH MAC CE for Multi-DCI based PDSCH Multi-TRP transmission, according to some other embodiments of the present closure.

For multi-DCI based PDSCH scheduling, TCI state activation and mapping to codepoints of the TCI field in DCI is done per CORESET pool and only a single TCI state can be mapped to a codepoint of TCI field in DCI. This means that a DCI sent in a CORESET pool can only schedule a PDSCH from an associated TRP. The corresponding TCI state activation/deactivation PDSCH MAC CE is shown in FIG. 9, where the TCI state with TCI-StateId i shall be activated and mapped to the codepoint of the DCI Transmission Configuration Indication field if the $T_i$ field is set to 1 and deactivated if the $T_i$ field is set to 0. The codepoint to which the TCI State is mapped is determined by its ordinal position among all the TCI States with $T_i$ field set to 1, i.e., the first TCI State with $T_i$ field set to 1 shall be mapped to the codepoint value 0, second TCI State with $T_i$ field set to 1 shall be mapped to the codepoint value 1 and so on. The maximum number of activated TCI states is eight per CORESET Pool. FIG. 9 illustrates TCI States Activation/Deactivation PDSCH MAC CE for Multi-DCI based PDSCH Multi-TRP transmission (reproduced from clause 6.1.3.14 in TS 38.321).

When the field "CORESET Pool ID" is set to 1, it indicates that this MAC CE shall be applied for the DL transmission scheduled by CORESET with the CORESET pool ID=1, otherwise, this MAC CE shall be applied for the DL transmission scheduled by CORESET with absence of the CORESET pool ID or with the CORESET pool ID=0. According to Table 6.2.1-1 of 3GPP TS 38.321, the Logical Channel ID (LCID) corresponding to this MAC CE is 53.

Single-PDCCH Based DL Data Transmission Over Multiple Transmission Points (TRP)

A PDSCH may be transmitted to a UE from multiple TRPs. Since different TRPs may be located in different physical locations and/or have different beams, the propagation channels can be different. To facilitate receiving PDSCH data from different TRPs or beams, a UE may be indicated with two TCI states, each associated with a TRP or a beam, by a single codepoint of a TCI field in a DCI.

Figure 10:
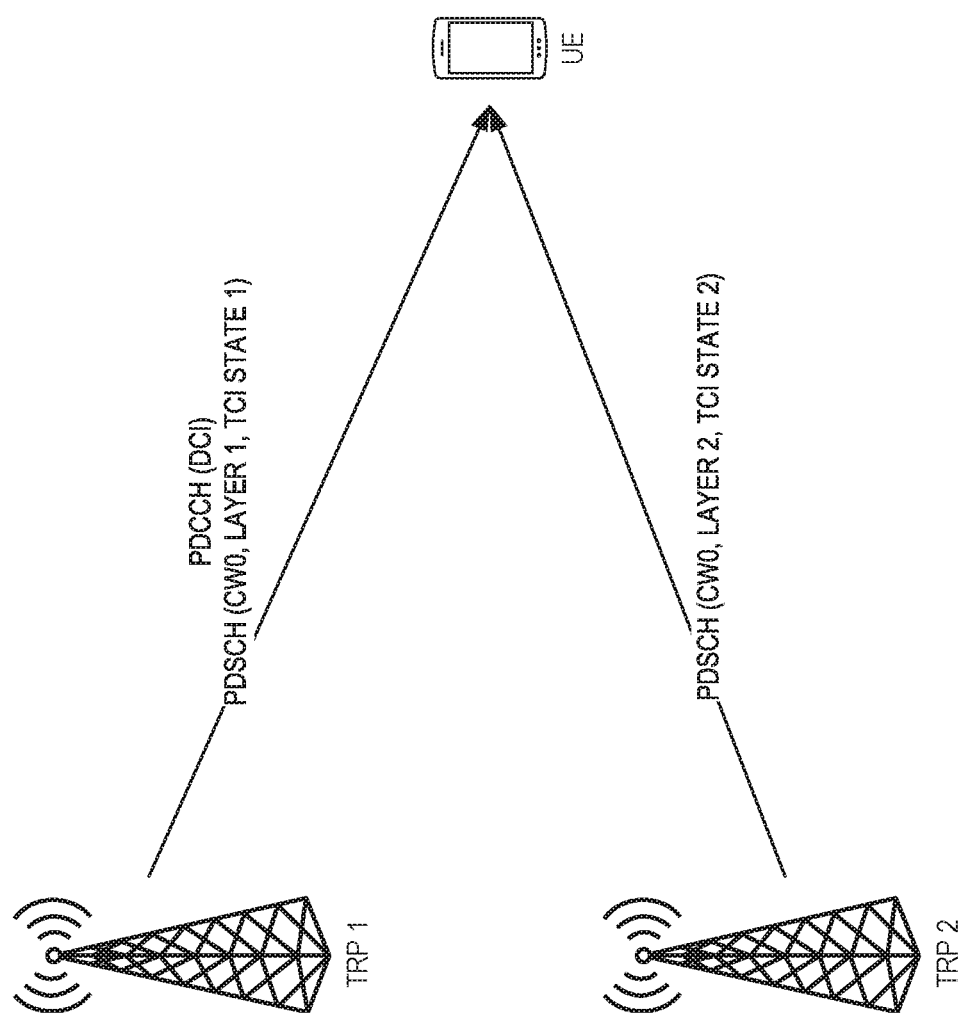
FIG. 10 illustrates an example of NC-JT supported in NR Rel-16 where a single CW is transmitted over two TRPs, according to some other embodiments of the present closure.

FIG. 10 illustrates an example of NC-JT supported in NR Rel-16 where a single CW is transmitted over two TRPs. One example of PDSCH transmission over two TRPs using a single DCI is shown in FIG. 10, where different layers of a PDSCH with a single codeword (e.g., CW0) are sent over two TRPs, each associated with a different TCI state. In this case, two DMRS ports, one for each layer, in two CDM groups are also signaled to the UE. A first TCI state is associated with the DMRS port in a first CDM group, and a second TCI state is associated with the DMRS port in a second CDM group. This approach is often referred to as NC-JT (Non-coherent joint transmission) or scheme 1a in NR Rel-16 3GPP cussions.

Transmitting PDSCH over multiple TRPs can also be used to improve PDSCH transmission reliability for URLLC applications. A number of approaches are introduced in NR Rel-16 including "FDMSchemeA","FDMSchemeB", "TDMSchemeA"and Slot based TDM scheme. Note that the terminology Scheme 4 is used in the cussions involving Slot based TDM scheme in NR Rel-16 3GPP cussions.

Figure 11:
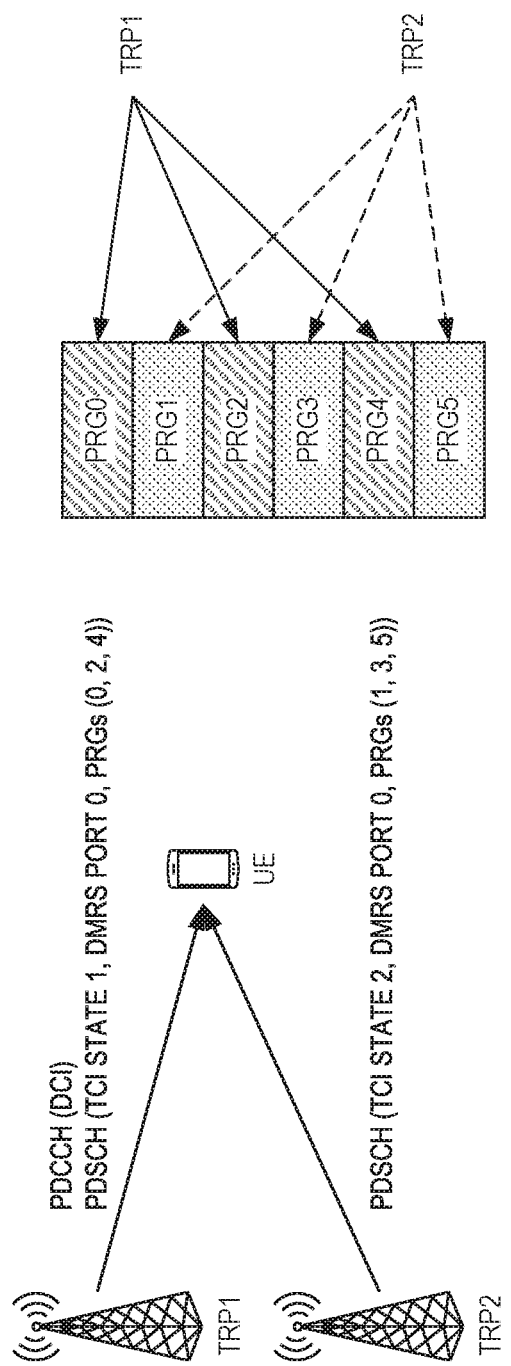
FIG. 11 illustrates an example of multi-TRP PDSCH transmission with FDMSchemeA, where a PDSCH is sent over TRP1 in PRGs (precoding RB group) {0, 2, 4} and over TRP2 in PRGs {1, 3, 5}, according to some other embodiments of the present closure.

An example of multi-TRP PDSCH transmission with FDMSchemeA is shown in FIG. 11, where a PDSCH is sent over TRP1 in PRGs (precoding RB group) {0, 2, 4} and over TRP2 in PRGs {1, 3, 5}. The transmission from TRP1 is associated with TCI state 1, while the transmission from TRP2 is associated with TCI state 2. Since the transmissions from TRP1 and TRP2 are non-overlapping in the case of FDMSchemeA, the DMRS ports can be the same (i.e., DMRS port 0 used for both transmissions). The PDSCH is scheduled by a PDCCH which is sent over TRP1.

Figure 12:
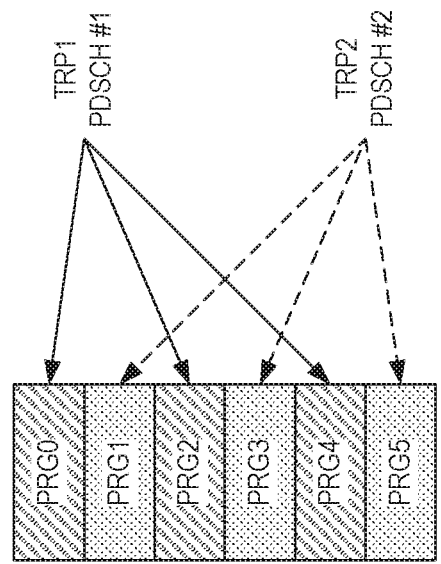
FIG. 12 shows an example data transmission with FDMSchemeB in which PDSCH#1 is transmitted in PRGs {0, 2, 4} from TRP1 and PDSCH#2 with the same TB is transmitted in PRGs {1, 3, 5} from TRP2 according to some other embodiments of the present closure.
Figure 12:
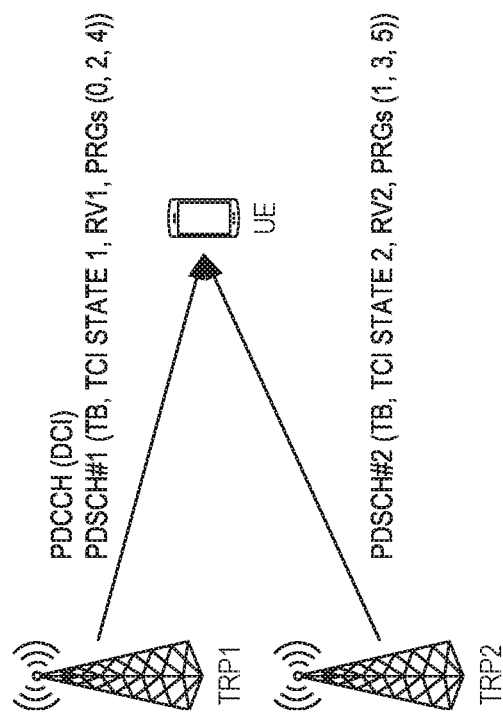

FIG. 12 shows an example data transmission with FDMSchemeB in which PDSCH#1 is transmitted in PRGs {0, 2, 4} from TRP1 and PDSCH#2 with the same TB is transmitted in PRGs {1, 3, 5} from TRP2. The transmission from TRP1 is associated with TCI state 1, while the transmission from TRP2 is associated with TCI state 2.

Since the transmissions from TRP1 and TRP2 are non-overlapping in the case of FDMSchemeB, the DMRS ports can be the same (i.e., DMRS port 0 used for both transmissions). The two PDSCHs carry the same encoded data payload but with a same or different redundancy version so that the UE can do soft combining of the two PDSCHs to achieve more reliable reception.

Figure 13:
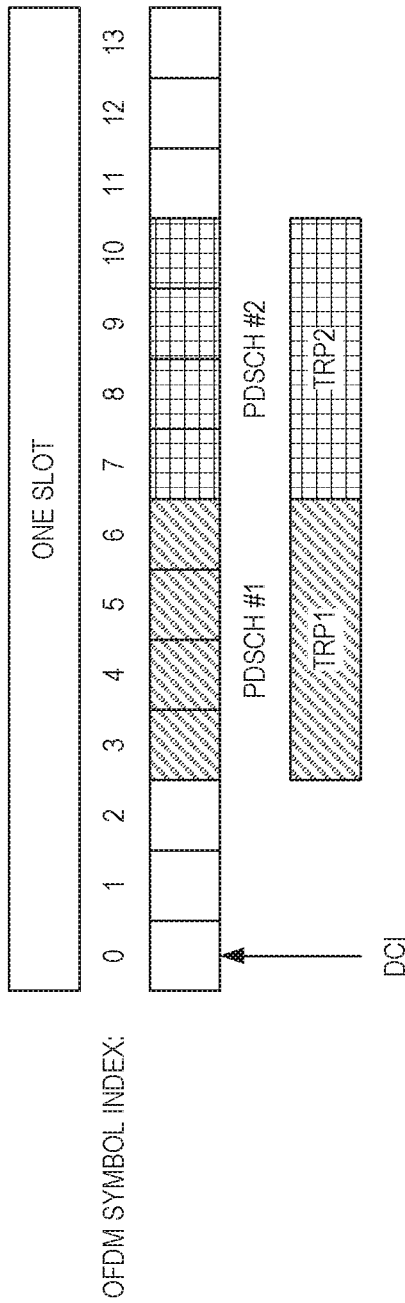
FIG. 13 shows an example data transmission with TDMSchemeA in which PDSCH repetition occurs in mini-slots of four OFDM symbols within a slot.

FIG. 13 shows an example data transmission with TDMSchemeA in which PDSCH repetition occurs in mini-slots of four OFDM symbols within a slot. Each PDSCH can be associated with a same or different RV. The transmission of PDSCH#1 from TRP1 is associated with a first TCI state, while the transmission of PDSCH#2 from TRP2 is associated with a second TCI state.

Figure 14:
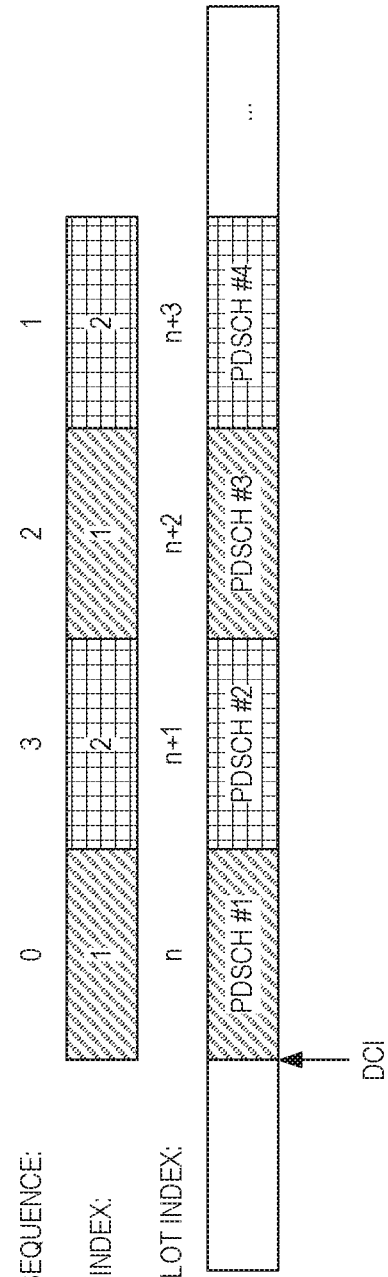
FIG. 14 illustrates an example of PDSCH transmission with multi-DCI with multiple TRPs, according to some embodiments.

FIG. 14 illustrates an example of PDSCH transmission with multi-DCI with multiple TRPs, according to some embodiments. For an example, Multi-TRP data transmission with Slot based TDM scheme is shown in FIG. 14, where four PDSCHs for a same TB are transmitted over two TRPs and in four consecutive slots. Each PDSCH is associated with a different RV. The transmission of odd numbered PDSCHs from TRP1 are associated with a first TCI state, while the transmission of even numbered PDSCHs from TRP2 is associated with a second TCI state.

Figure 15:
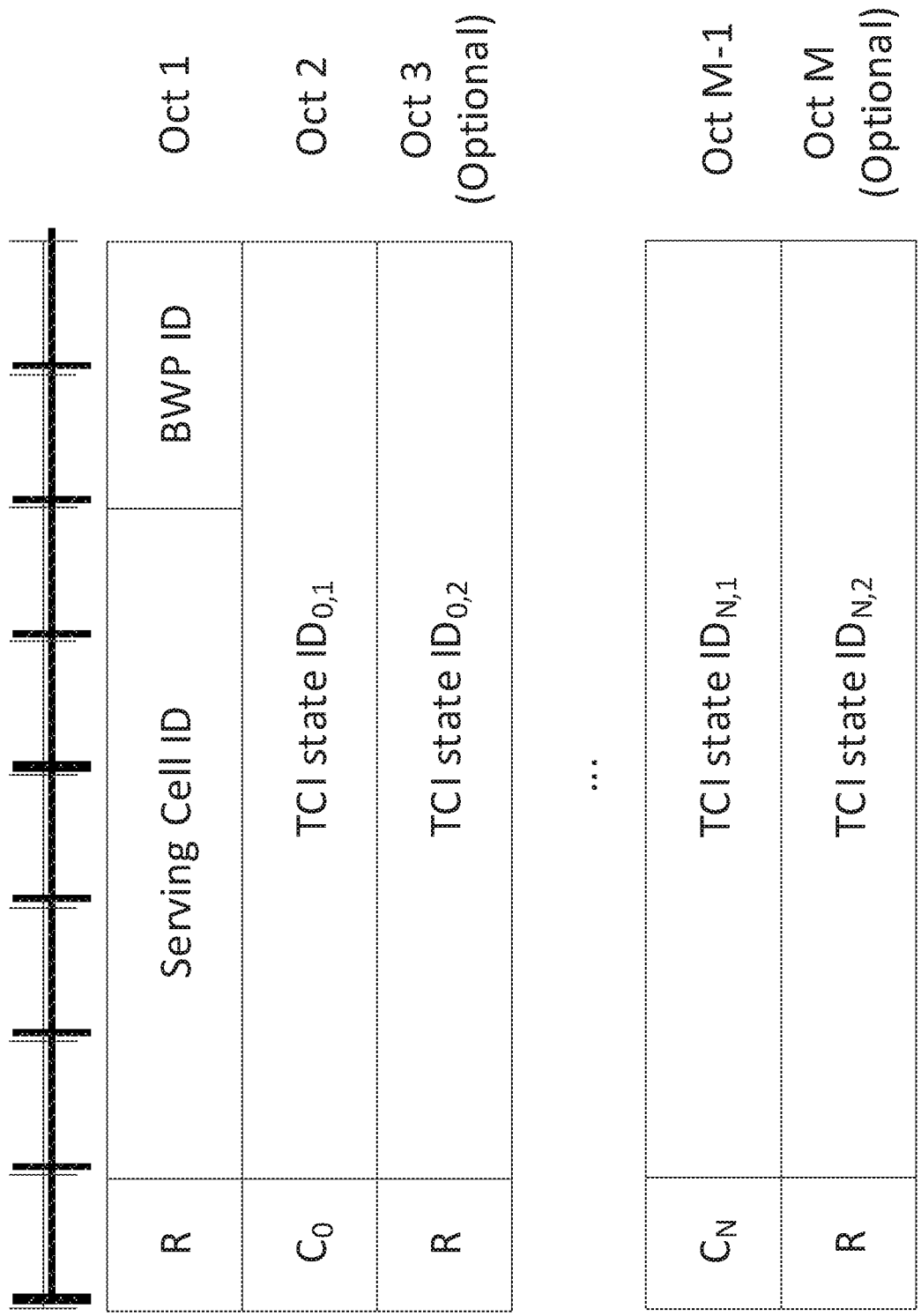
FIG. 15 illustrates Enhanced TCI States Activation/Deactivation PDSCH MAC CE for Single-DCI based PDSCH Multi-TRP transmission according to some other embodiments of the present closure.

For all the single-PDCCH based DL multi-TRP PDSCH schemes, a single DCI transmitted from one TRP is used to schedule multiple PDSCH transmissions over two TRPs. The network configures the UE with multiple TCI states via RRC, and a new MAC CE was introduced in NR Rel-16. The enhanced PDSCH MAC CE is shown in FIG. 15 which illustrates Enhanced TCI States Activation/Deactivation PDSCH MAC CE for Single-DCI based PDSCH Multi-TRP transmission (reproduced from clause 6.1.3.24 in TS 38.321). This MAC CE can be used to map a codepoint in the TCI field to one or two TCI states.

In this enhanced PDSCH MAC CE, TCI state $ID_{i,j}$ denotes the $j^{th}$ TCI state indicated for the nth codepoint in the TCI field of DCI. Furthermore, the $C_{i,field}$ in MAC CE indicates if an additional TCI state is associated with the $i^{th}$ codepoint in the TCI field of DCI. TCI state $ID_{i,j}$ and the $C_i$ field in MAC CE are hence used to provide mapping of activated TCI states to codepoints of TCI field in DCI. The TCI state $ID_{i,j}$ also provides the activated TCI states for PDSCH. For example, if $C_i$ field is set to 0, then there is only 1 TCI state (i.e., TCI state$ID_{i,1}$) mapped to codepoint i of the TCI field of DCI, and the additional TCI state TCI state $ID_{i,2}$ is not present in the MAC CE. If $C_i$ field is set to 1, then there are 2 TCI states (i.e., TCI state $ID_{i,1}$ and TCI state $ID_{i,2}$) mapped to codepoint i of the TCI field of DCI, and the additional TCI state TCI state $ID_{i,2}$ is present in the MAC CE. According to Table 6.2.1-1 of 3GPP TS 38.321, the logical channel ID (LCID) corresponding to this MAC CE is 46.

Default TCI State Definitions in NR Rel-15

In NR Rel-15, a threshold timeDurationForQCL is reported by the UE based on the UE's capability. In the scheduling DCI, the UE may receive an indication of the TCI state and an indication of the time offset between the reception of the DL DCI and the corresponding PDSCH.

If the TCI state is indicated in DCI scheduling the PDSCH, the UE uses the indicated TCI state for determining the PDSCH DMRS antenna ports' quasi co-location when the time offset between the reception of the DL DCI and the corresponding PDSCH is equal to greater than the threshold timeDurationForQCL.

If the time offset between the reception of the DL DCI and the corresponding PDSCH is less than the threshold timeDurationForQCL, the UE may assume that the PDSCH DMRS antenna port(s) are quasi-collocated with the RS(s) with respect to the QCL parameter(s) used for PDCCH quasi co-location indication of the CORESET associated with a monitored search space with the lowest CORESET-ID in the latest slot. This assumption of quasi-collocation with the RS(s) of the CORESET with the lowest CORESET-ID is referred to as 'default TCI state' in this closure.

If none of configured TCI states for the serving cell of scheduled PDSCH contains 'QCL-TypeD', the UE shall obtain the other QCL assumptions from the TCI states indicated by DCI for its scheduled PDSCH irrespective of the time offset between the reception of the DL DCI and the corresponding PDSCH.

Default TCI State(s) Definitions in NR Rel-16

In NR Rel-16, default TCI states are defined for multi-DCI and single-DCI based multi-TRP PDSCH transmissions are defined.

For single-DCI based multi-TRP PDSCH transmission scheme, two default TCI states are defined. Each of the two default TCI states corresponds to a different TRP. In 3GPP TS 38.214 (V16.1.0), the two default TCI states for single-DCI based multi-TRP PDSCH transmission scheme are defined as follows:

"If the offset between the reception of the DL DCI and the corresponding PDSCH is less than the threshold timeDurationForQCL and at least one configured TCI state for the serving cell of the PDSCH contains the 'QCL-TypeD', and at least one TCI codepoint indicates two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states."

FIG. 16 shows an example of the default TCI states for a given Codepoint of TCI field to TCI state mapping. In this example, the lowest codepoint that contains two different TCI states is codepoint 1. Hence, the default TCI states for single-DCI based multi-TRP PDSCH schemes in this example is given by the TCI states with IDs 2 and 3.

For multi-DCI based multi-TRP PDSCH transmission scheme, two default TCI states are also defined. Each of the two default TCI states corresponds to a different TRP. In 3GPP TS 38.214 (V16.1.0), the two default TCI states for multi-DCI based multi-TRP PDSCH transmission scheme are defined as follows:

"If a UE configured by higher layer parameter PDCCH-Config that contains two different values of CORESET-PoolIndex in Contro/ResourceSet, for both cases, when TCI-PresentInDCI is set to 'enabled' and TCI-PresentInDCI is not configured in RRC connected mode, if the offset between the reception of the DL DCI and the corresponding PDSCH is less than the threshold timeDurationForQCL, the UE may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE."

Figure 17:
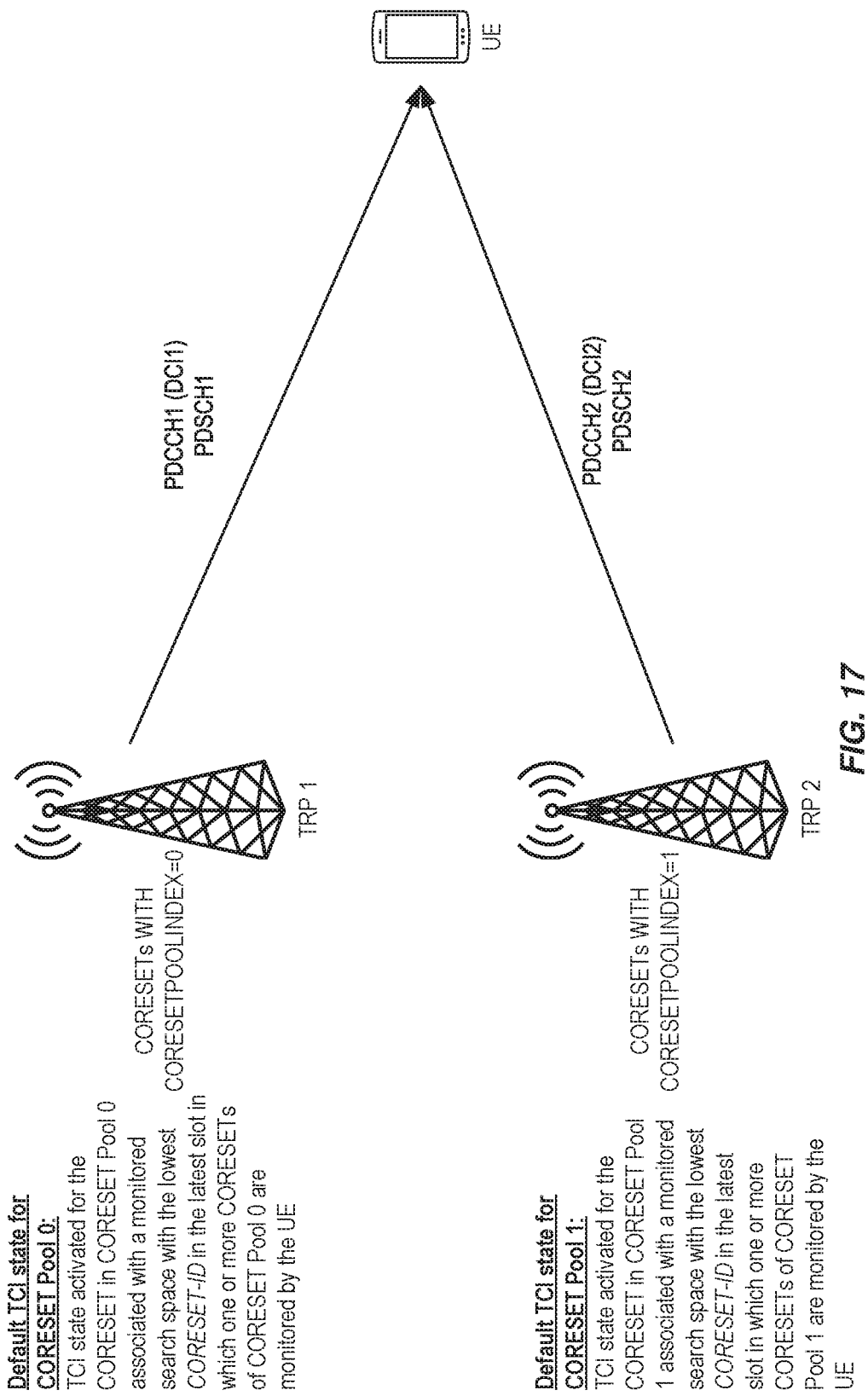
FIG. 17 shows an example illustrating the default TCI states for multi-DCI based PDSCH multi-TRP transmission according to some other embodiments of the present closure.

FIG. 17 shows an example illustrating the default TCI states for multi-DCI based PDSCH multi-TRP transmission. In this example, PDSCH 1 is scheduled by PDCCH 1 via a CORESET in CORESET Pool 0 from TRP1, and PDSCH 2 is scheduled by PDCCH 2 via a CORESET in CORESET Pool 1 from TRP2. The simplified default TCI state definitions for the two PDSCHs from TRP1 and TRP2 are given in the figure.

DCI formats for Downlink PDSCH Scheduling

In NR Rel-15, two DCI formats were defined for scheduling PDSCH in NR, i.e., DCI format 1_0 and DCI format 1_1. DCI format 1_0 has a smaller size than DCI format 1_1 and can be used when a UE is not fully connected to the network while DCI format 1_1 can be used for scheduling MIMO (Multiple-Input-Multiple-Output) transmissions with 2 transport blocks (TBs). A TC/field is present in DCI format 1_1 when higher layer parameter TCI-PresentInDCI is set to 'enabled' in a CORESET. As specified in 3GPP TS 38.212, the TCI field when enabled contains 3 bits. The TCI field in DCI format 1_1 indicates the TCI state(s) which provides the source reference signal for PDSCH DMRS ports. In DCI format 1-0, however, there is no TCI field.

In NR Rel-16, new DCI formats 1_2 for DL scheduling are introduced. One of the main motivations for having the new DCI formats is to be able to configure a very small DCI size which can provide some PDCCH reliability improvement without losing much flexibility. The main design target of the new DCI format is thus to have DCI with configurable sizes for some fields, including potential new fields, with a minimum DCI size targeting a reduction of 10-16 bits relative to Rel-15 DCI formats 0_0/1_0.

The TCI field in DCI format 1_2 can have sizes of 0, 1, 2, or 3 bits. The presence of the TCI field in DCI format 1_2 is configured per CORESET via the higher layer parameter tci-PresentInDCI-ForDCI-Format1-2. The value of the configured tci-PresentInDCI-ForDCI-Format1-2 per CORESET can be either 1, 2, or 3 which indicates the number of bits in the TCI field of DCI format 1_2 for that CORESET. Hence, the number of codepoints in the TCI field of DCI format 1_2 can be different between different CORESETs.

There currently exist certain challenges. For DCI format 1_1, when the TCI field is enabled, the TCI field in DCI format 1_1 is always 3 bits (i.e., 8 codepoints). So, the number of TCI field codepoints in DCI format 1_1 does not change when TCI field is enabled in different CORESETs.

However, TCI field in DCI format 1_2 is variable between 0, 1, 2, or 3 bits (i.e., 0, 2, 4, or 8 codepoints). Furthermore, with DCI format 1_2, it is possible that different TCI field sizes may be used for different CORESETs when td-PresentInDCI-ForDCI-Format1-2 is set to different values in different CORESETs.

In NR, a UE can be configured to monitor both DCI formats 1_1 and 1_2 for PDSCH scheduling. For instance, when a UE is served with URLLC traffic with stringent delay and reliability requirements, the UE may be scheduled in DL using format DCI format 1_2. DCI format 1_1 may be used when scheduling the UE with eMBB traffic.

The current MAC CE designs of FIG. 9 and FIG. 15 works well for DCI format 1_1 where the number of codepoints in the TCI field is 8 whenever the TCI field is enabled via the TCI-PresentInDCI parameter. However, the current MAC CE designs of FIG. 9 and FIG. 15 do not address TCI state activation and TCI field codepoint to TCI state mapping for DCI format 1_2 where the number of TCI field codepoints for DCI format 1_2 may be different in different CORESETs.

Hence, it is an open problem how to activate TCI states and perform TCI field codepoint to TCI state mapping for DCI format 1_2 (particularly when the UE is configured to monitor both DCI formats 1_1 and 1_2). Another related problem is how to define the default TCI states when the UE is configured to monitor both DCI formats 1_1 and 1_2 for PDSCH scheduling.

Systems and methods for TCI state activation and codepoint to TCI state mapping are provided. In some embodiments, a method performed by a wireless device for activating TCI states includes one or more of: being configured to monitor a plurality of DCI formats with the TCI field for PDSCH) reception; receiving a single Medium Access Control MAC CE to activate TCI states and map activated TCI states to the TCI field codepoints of the plurality of DCI formats; and receiving separate MAC CEs to activate TCI states and map activated TCI states to the TCI field codepoints of each of the plurality of DCI formats. In some embodiments, one or more of the plurality of DCI formats are DCI format 1_1 and/or 1_2. Benefits might include that the TCI states for downlink scheduling can be more flexibly chosen for each DCI format by using separate MAC CEs. For instance, DCI format 1_2 may be used to schedule URLLC data in downlink with one set of TCI states (e.g., one set of beams), and DCI format 1_1 may be used to schedule eMBB data in the downlink with another set of TCI states (e.g., a second set of beams).

Figure 18:
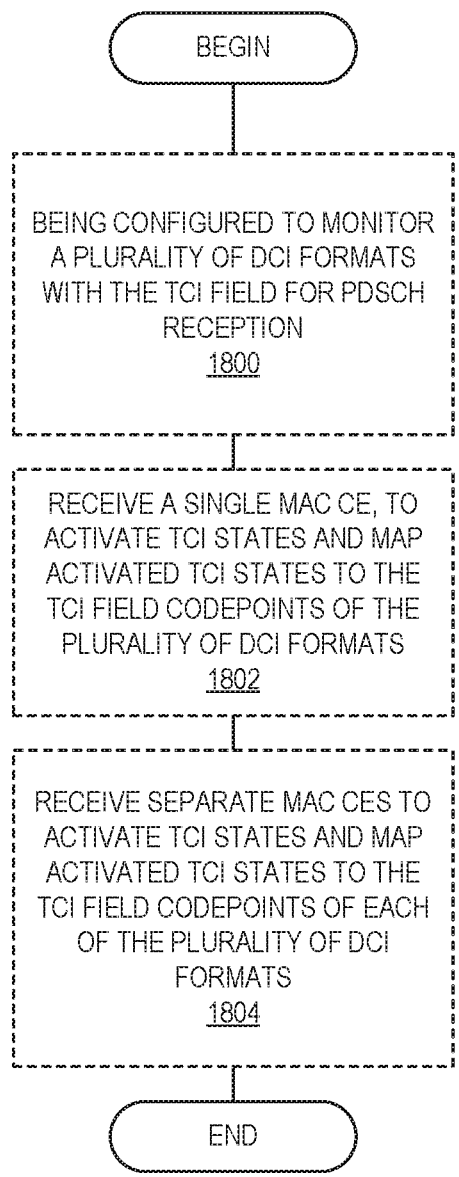
FIG. 18 illustrates a method performed by a wireless device for activating Transmission Configuration Indicator (TCI) states according to some other embodiments of the present closure.

FIG. 18 illustrates a method performed by a wireless device for activating Transmission Configuration Indicator (TCI) states. In some embodiments, the method includes one or more of: being configured to monitor a plurality of Downlink Control Information (DCI) formats with the TCI field for Physical Downlink Shared Channel (PDSCH) reception (step 1800); receiving a single Medium Access Control (MAC) Control Element (CE) to activate TCI states and map activated TCI states to the TCI field codepoints of the plurality of DCI formats (step 1802); and receiving separate MAC CEs to activate TCI states and map activated TCI states to the TCI field codepoints of each of the plurality of DCI formats (step 1804).

Figure 19:
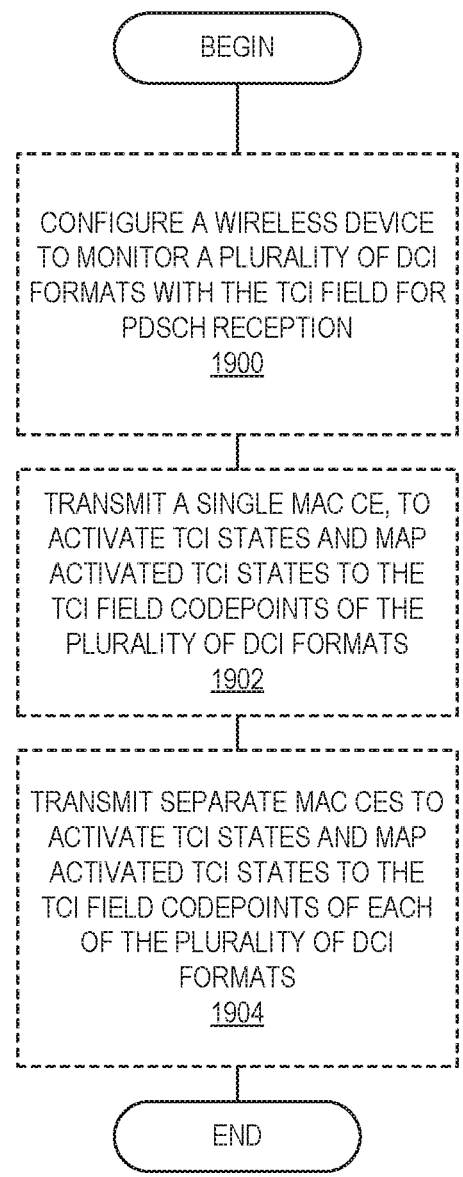
FIG. 19 illustrates a method performed by a base station for activating TCI states according to some other embodiments of the present closure.

FIG. 19 illustrates a method performed by a base station for activating TCI states. In some embodiments, the method includes one or more of: configuring a wireless device to monitor a plurality of DCI formats with the TCI field for PDSCH reception (step 1900); transmitting, to the wireless device, a single MAC CE to activate TCI states and map activated TCI states to the TCI field codepoints of the plurality of DCI formats (step 1902); and transmitting, to the wireless device, separate MAC CEs to activate TCI states and map activated TCI states to the TCI field codepoints of each of the plurality of DCI formats (step 1904).

In this way, benefits of some embodiments might include that a single MAC CE can be used to provide the TCI state activation and TCI state to TCI field codepoint mapping to multiple downlink DCI formats which avoids the need for introducing separate MAC CEs for each downlink DCI format.

There are also benefits associated with some other embodiments using different MAC CEs to provide the TCI state activation and TCI state to TCI field codepoint mapping to multiple downlink DCI formats. The benefits might include that the TCI states for downlink scheduling can be more flexibly chosen for each DCI format by using separate MAC CEs. For instance, DCI format 1_2 may be used to schedule URLLC data in downlink with one set of TCI states (e.g., one set of beams), and DCI format 1_1 may be used to schedule eMBB data in the downlink with another set of TCI states (e.g., a second set of beams).

Another benefit of the proposed solution might be that it provides the default TCI state definitions when the TCI state activation and TCI state to TCI field codepoint mapping to multiple downlink DCI formats are provided by either a single MAC CE or different MAC CEs.

Embodiment 1—Using a Single MAC CE to Map Activated TCI States to TCI Field Codepoints of Both DCI Format 1_1 and 1_2

In one embodiment, a single MAC CE is used to activate TCI states and map the activated TCI states to TCI field codepoints of both DCI formats 1_1 and 1_2. In this embodiment, the TCI states activated and mapped to the codepoint of the TCI field in DCI format 1_2 is a subset of the TCI states activated and mapped to the codepoints of the TCI field in DCI format 1_1.

This embodiment applies to both current MAC CEs (i.e., the ones in FIG. 9 and FIG. 15 in this closure).

In particular, if K (K=1, 2, 3) bits are configured for DCI format 1_2, the S=2 K codepoints of DCI format 1_2 are mapped to the first S=2 K codepoints in the MAC CE. FIG. 20 illustrates an example showing a subset of the activated TCI states mapped to the TCI field in DCI format 1_1 being mapped to the codepoints of TCI field in DCI format 1_2, according to some embodiments. An example for the case when the TCI field of DCI format 1_2 has 4 codepoints (i.e., K=2 and S=4) is shown in FIG. 20. In this example, the activated TCI states mapped to the first 4 TCI field codepoints in DCI format 1_1 are mapped to the TCI field codepoints in DCI format 1_2.

Figure 21:
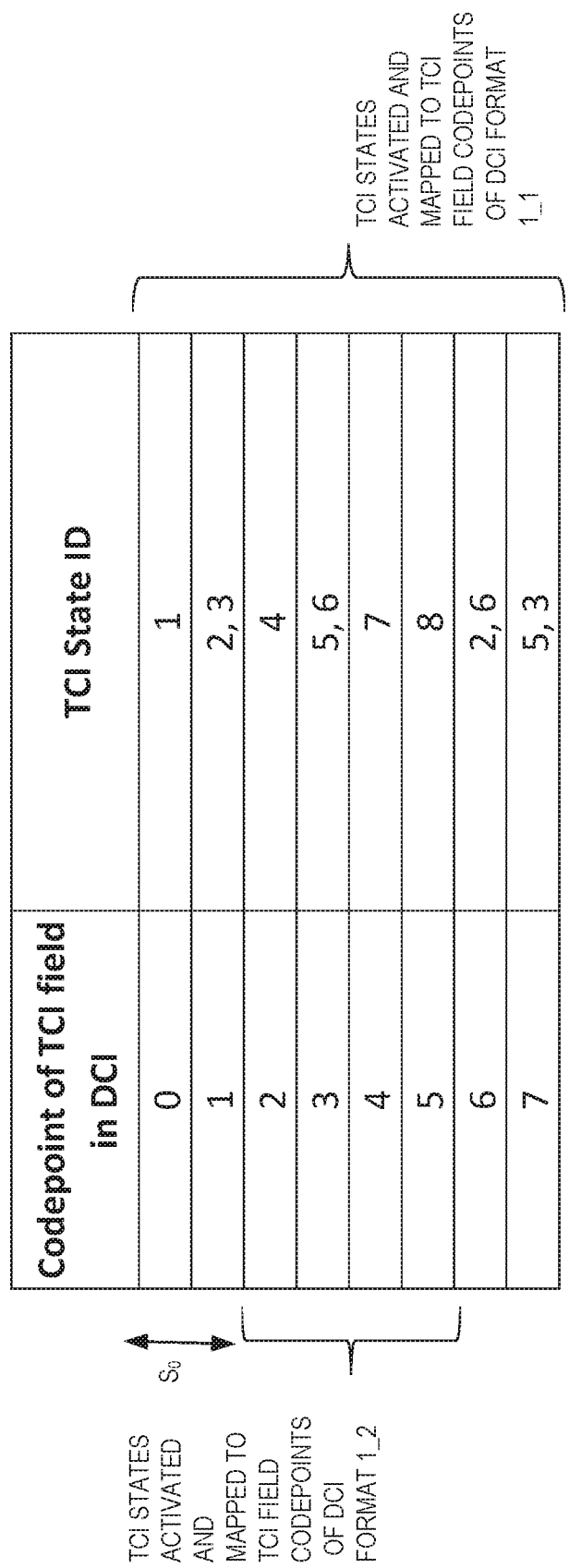
FIG. 21 illustrates a second example showing a subset of the activated TCI states mapped to the TCI field in DCI format 1_1 being mapped to the codepoints of TCI field in DCI format 1_2, according to some embodiments.

In an alternative embodiment, an offset So may be configured such that when the TCI field of DCI format 1_2 has S<8 codepoints, the activated TCI states corresponding to the codepoints $S_0+1$ to $S_0+S$ in DCI format 1_1 are mapped to the S codepoints in DCI format 1_2. Here, So is a codepoint offset value satisfying $(S_0+5)$ 8 that may be a fixed value specified in specifications or a configurable higher layer parameter. In case So is a configurable parameter, this configurable parameter may be configured in a CORESET where tci-PresentInDCI-ForDCI-Format1-2 is configured. FIG. 21 illustrates a second example showing a subset of the activated TCI states mapped to the TCI field in DCI format 1_1 being mapped to the codepoints of TCI field in DCI format 1_2, according to some embodiments. FIG. 21 shows an example for the case when $S_0=2$.

To incorporate this embodiment into the MAC CE in FIG. 9, the field description for $T_i$ in the MAC CE of FIG. 9 can be modified as follows (with modifications shown in bold):

$T_i$: If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e., the first TCI State with $T_i$ field set to 1 shall be mapped to the codepoint value 0, second TCI State with $T_i$ field set to 1 shall be mapped to the codepoint value 1 and so on. When the number of codepoints S in the TCI field of DCI format 1_2 is less than the maximum number of codepoints in the TCI field of DCI format 1_1, the activated TCI states mapped to the first S TCI field codepoints in DCI format 1_1 are mapped to the TCI field codepoints in DCI format 1_2. The maximum number of activated TCI states is 8.

Similarly, this embodiment can be incorporated into the MAC CE of FIG. 15 in 3GPP TS 38.321 by modifying the field description for the TCI state IDi,j field in the MAC CE of FIG. 15 as follows:

TCI state IDi,j: This field indicates the TCI state identified by TCI-StateId as specified in TS 38.331 [5], where i is the index of the codepoint of the DCI Transmission configuration indication field as specified in TS 38.212 [9] and TCI state IDi,j denotes the jth TCI state indicated for the ith codepoint in the DCI Transmission Configuration Indication field. The TCI codepoint to which the TCI States are mapped is determined by its ordinal position among all the TCI codepoints with sets of TCI state IDi,j fields, i.e., the first TCI codepoint with TCI state ID0,1 and TCI state ID0,2 shall be mapped to the codepoint value 0, the second TCI codepoint with TCI state ID1,1 and TCI state ID1,2 shall be mapped to the codepoint value 1 and so on. The TCI state IDi,2 is optional based on the indication of the Ci field. When the number of codepoints S in the TCI field of DCI format 1_2 is less than the maximum number of codepoints in the TCI field of DCI format 1_1, the activated TCI states mapped to the first S TCI field codepoints in DCI format 1_1 are mapped to the TCI field codepoints in DCI format 1_2. The maximum number of activated TCI codepoint is 8 and the maximum number of TCI states mapped to a TCI codepoint is 2.

The main benefit of this embodiment is that the existing MAC CEs can be reused by incorporating the solutions of this embodiment into these existing MAC CEs. Hence, the need for introducing new MAC CEs is avoided.

In a variant of this embodiment, the said mapping is specified in TS 38.214 or TS 38.212 and no changes are introduced in the TS 38.321. That is, the below text is added to TS 38.214:

"When the number of codepoints S in the TCI field of DCI format 1_2 is less than the number of codepoints in the TCI field of DCI format 1_1, the activated TCI states mapped to the first S TCI field codepoints in DCI format 1_1 are mapped to the TCI field codepoints in DCI format 1_2."

Alternatively, the following text may be added in 38.214:

"When the number of codepoints S in the TCI field of a DCI is less than the maximum number of codepoints in the MAC CE activation command, the S codepoints are mapped to first S codepoints in the MAC CE activation command."

In some embodiments, when the UE is configured with two CORESETs with different CORESET pool indices wherein DCI format 1_2 is enabled in one of the two CORESETs, then the MAC CE of FIG. 9 can be used to indicate the activated TCI state to TCI field codepoint mapping for DCI format 1_2 only if the MAC CE indicates a 'CORESET Pool ID' which corresponds to the CORESET Pool index of the CORESET in which DCI format 1_2 is enabled. Consider the following example:

CORESET 1 in which CORESET Pool index 0 is configured and DCI format 1_2 is enabled; and/or CORESET 2 in which CORESET Pool index 1 is configured and DCI format 1_2 is abled.

In this case, if the MAC CE of FIG. 9 with 'CORESET Pool ID=0' indicates a activated TCI state to TCI field codepoint mapping, then this activated TCI state to TCI field codepoint mapping applies to DCI format 1_2. When a DCI with format 1_2 is sent via CORESET 1, then activated TCI state to TCI field codepoint mapping applies to the DCI with format 1_2. However, if the MAC CE of FIG. 9 with 'CORESET Pool ID=1' indicates a activated TCI state to TCI field codepoint mapping, then this activated TCI state to TCI field codepoint mapping does not apply to DCI format 1_2 since DCI format 1_2 is not enabled in CORESET 2. This UE behavior may also depend on the UE having the capability for supporting two different CORESET pools to be configured (i.e., the UE indicates this capability to the gNB). If the UE does not have the capability for supporting two different CORESET pools, then the rule of allowing activated TCI state to TCI field codepoint mapping for DCI format 1_2 depending on 'CORESET Pool ID' indicated in the MAC CE of FIG. 9 does not apply.

In one other embodiment, only certain MAC CEs are used to provide TCI state to TCI field codepoint mapping for DCI format 1_2. For instance, in one embodiment, only MAC CE of FIG. 9 is allowed to provide TCI state to TCI field codepoint mapping for DCI format 1_2. With this embodiment, to allow different TCI state to TCI field codepoint mapping for DCI formats 1_1 and 1_2, different MAC CEs can be used. For example, the MAC CE of FIG. 9 can be used to provide TCI state to TCI field codepoint mapping for DCI format 1_2, but the MAC CE of FIG. 15 can be used to provide TCI state to TCI field codepoint mapping for DCI format 1_1.

Embodiment 2—Using Separate MAC CEs to Map Activated TCI States to TCI Field Codepoints of DCI Format 1_1 and 1_2

In some scenarios, it may be beneficial to activate different TCI states and map different sets of activated TCI states to the TCI field codepoints of DCI format 1_1 and 1_2. This is because DCI format 1_2 may be used to schedule URLLC data in downlink with one set of TCI states (e.g., one set of beams), and DCI format 1_1 may be used to schedule eMBB data in the downlink with another set of TCI states (e.g., a second set of beams).

In this embodiment, to activate different set of TCI states (i.e., different from those activated for DCI format 1_1) and map these TCI states to the TCI field codepoints of DCI format 1_2 a separate new MAC CE is defined with the similar structure to the MAC CE in FIG. 9 is introduced in NR. The new MAC CE is only used for activating TCI states and mapping these TCI states to the TCI field codepoints of DCI format 1_2. The new MAC CE is allocated a new LCID either from existing LCID space specified in Table 6.2.1-1 in 3GPP TS 38.321 or from newly introduces eLCID space in Table 6.2.1-1a in TS 38.821. The existing MAC CE of FIG. 9 (with corresponding LCID 53) is only used for activating TCI states and mapping these TCI states to the TCI field codepoints of DCI format 1_1. This is beneficial for activating different sets of TCI states for the two DCI formats when the Multi-DCI based PDSCH Multi-TRP scheme is used in a scenario.

Similarly, a new MAC CE similar in structure to the MAC CE in FIG. 15 can be introduced in NR to activate different set of TCI states (i.e., different from those activated for DCI format 1_1) and map these TCI states to the TCI field codepoints of DCI format 1_2. The new MAC CE is only used for activating TCI states and mapping these TCI states to the TCI field codepoints of DCI format 1_2. The new MAC CE is allocated a new LCID either from existing LCID space specified in Table 6.2.1-1 in 3GPP TS 38.821 or from newly introduces eLCID space in Table 6.2.1-1a in 3GPP TS 38.821-g00. The existing MAC CE of FIG. 15 (with corresponding LCID 46) is only used for activating TCI states and mapping these TCI states to the TCI field codepoints of DCI format 1_1. This is beneficial for activating different sets of TCI states for the two DCI formats when the Single-DCI based PDSCH Multi-TRP scheme is used in a scenario.

Embodiment 3

In order to have the flexibility of allocating different TCI states to DCI format 1_1 and 1_2 but not to increase the number of MAC CEs (i.e., by not introducing new MAC CEs), it is possible to enhance the Release 16 MAC CE in FIG. 15 of this closure.

In one embodiment, the reserved bit R in the MAC CE in FIG. 15 is used to indicate which DCI format the MAC CE applies to. According to this embodiment, the R field is changed to E field and if E field is set to "0" the MAC CE applies to DCI format 1_1 and if the E field is set to "1", the MAC CE applies to DCI format 1_2. The needed change to clause 6.1.3.24 of 3GPP TS38.321 according to this embodiment is shown below where added text is marked bold:

6.1.3.24 Enhanced TCI States Activation/Deactivation for UE-specific PDSCH MAC CE The Enhanced TCI States Activation/Deactivation for UE-specific PDSCH MAC CE is identified by a MAC PDU subheader with LCID as specified in Table 6.2.1-1. It has a variable size consisting of one or more of the following fields:

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field as specified in TS 38.212 [9]. The length of the BWP ID field is 2 bits;

$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;

TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the $j^{th}$ TCI state indicated for the $i^{th}$ codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the $C_i$ field. The maximum number of activated TCI codepoint is 8 and the maximum number of TCI states mapped to a TCI codepoint is 2.

E: This field indicates to which DCI format the TCI state $ID_i$, applies to. If the E field is set to "0", the MAC CE applies to DCI format 1_1 and if the E field is set to "0", the MAC CE applies to DCI format 1_2.

In another embodiment, the maximum number of activated TCI codepoints is increased from 8 to 8+S, where S is the number of codepoints configured for DCI format 1_2. The first eight codepoints correspond to DCI format 1_1 and the last S codepoints correspond to DCI format 1_2. In this embodiment, S can take on values of 0, 2, 4, or 8. This mapping can be detailed in 3GPP TS 38.214. The needed change to TS 38.821 assuming the exact mapping is in TS 38214, according to this embodiment is shown below where added text is marked bold:

6.1.3.24 Enhanced TCI States Activation/Deactivation for UE-specific PDSCH MAC CE The Enhanced TCI States Activation/Deactivation for UE-specific PDSCH MAC CE is identified by a MAC PDU subheader with LCID as specified in Table 6.2.1-1. It has a variable size consisting of following fields:

- Serving Cell ID: This field indicates the identity of the Serving Cell for which the MAC CE applies. The length of the field is 5 bits;
- BWP ID: This field indicates a DL BWP for which the MAC CE applies as the codepoint of the DCI bandwidth part indicator field as specified in TS 38.212 [9]. The length of the BWP ID field is 2 bits;
- C: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;
- TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the $j^{th}$ TCI state indicated for the $i^{th}$ codepoint in the DCI Transmission Configuration Indication field. The TCI codepoint to which the TCI States are mapped is determined by its ordinal position among all the TCI codepoints with sets of TCI state $ID_{i,j}$ fields. For DCI format 1_1, the $s^{th}$ ($0 \leq s \leq 7$) TCI codepoint with TCI state $ID_{s,1}$ and TCI state $ID_{s,2}$ shall be mapped to the codepoint value s of the DCI Transmission configuration indication field. For DCI format 1_2, the $s^{th}$ ($8 \leq s \leq S+7$) TCI codepoint with TCI state $ID_{s,1}$ and TCI state $ID_{s,2}$ shall be mapped to the codepoint value (s-8) of the DCI Transmission configuration indication field. The TCI state $ID_{i,2}$ is optional based on the indication of the $C_i$ field. The maximum number of activated TCI codepoint is S if UE is configured only with DCI format 1_2, 8 if UE is configured only with DCI format 1_1, and 8+S if UE is configured with both DCI formats 1_1 and 1_2, where S is the number of codepoints configured for DCI format 1_2. The maximum number of TCI states mapped to a TCI codepoint is 2.
- R: Reserved bit, set to "0".

Embodiment 4: Default TCI State Definitions

In this section, default TCI state definitions are provided corresponding to the enhancements proposed in Embodiments 1-3. Note that activation command in the rest of the section refers to sending the MAC CE (i.e., any one of the MAC CEs proposed in embodiments 1-3 above) to activate TCI states.

A Single MAC CE is used for TCI State Activation Corresponding to DCI Formats 1_1 and 1_2

When a single activation command is used for TCI state activation/deactivation for both DCI formats 1_1 and 1_2, the default TCI states are the TCI states corresponding to the lowest codepoint, among the TCI codepoints contained in the MAC CE activation command, containing two different TCI states.

More specifically, if the offset between the reception of a DL DCI and the corresponding PDSCH is less than the threshold timeDurationForQCL and at least one configured TCI states for the serving cell of scheduled PDSCH contains the 'QCL-TypeD', and at least one TCI codepoint in the activation command indicates two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states in the activation command.

Separate MAC CEs for TCI Activation for DCI Formats 1_1 and 1_2

When separate activation commands are used for TCI state activation/deactivation for DCI formats 1_1 and 1_2, the default TCI states can be the TCI states corresponding to the lowest codepoint, among the TCI codepoints contained in one of the two activation commands, containing two different TCI states.

More specifically, if the offset between the reception of a DL DCI and the corresponding PDSCH is less than the threshold timeDurationForQCL and at least one configured TCI states for the serving cell of scheduled PDSCH contains the 'QCL-TypeD', and at least one TCI codepoint in at least one of the activation commands indicate two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states in one of the activation commands.

If both of the activation commands contain a codepoint mapped to two TCI states, in one embodiment, the one of the two activation commands can be determined by specification. For example, the activation command for DCI format 1_1 is always selected in this case. Alternatively, the one of the two activation commands can be configured by higher layer.

Figure 22:
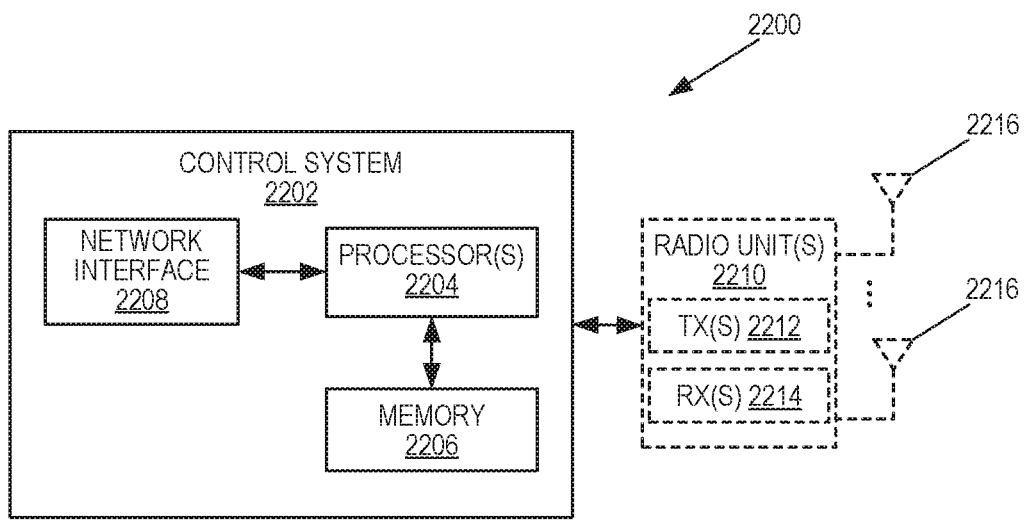
FIG. 22 is a schematic block diagram of a radio access node according to some embodiments of the present closure.

FIG. 22 is a schematic block diagram of a radio access node 2200 according to some embodiments of the present closure. Optional features are represented by dashed boxes. The radio access node 2200 may be, for example, a base station 302 or 306 or a network node that implements all or part of the functionality of the base station 302 or gNB described herein. As illustrated, the radio access node 2200 includes a control system 2202 that includes one or more processors 2204 (e.g., Central Processing Units (CPUs), Application Specific Integrated Circuits (ASICs), Field Programmable Gate Arrays (FPGAs), and/or the like), memory 2206, and a network interface 2208. The one or more processors 2204 are also referred to herein as processing circuitry. In addition, the radio access node 2200 may include one or more radio units 2210 that each includes one or more transmitters 2212 and one or more receivers 2214 coupled to one or more antennas 2216. The radio units 2210 may be referred to or be part of radio interface circuitry. In some embodiments, the radio unit(s) 2210 is external to the control system 2202 and connected to the control system 2202 via, e.g., a wired connection (e.g., an optical cable). However, in some other embodiments, the radio unit(s) 2210 and potentially the antenna(s) 2216 are integrated together with the control system 2202. The one or more processors 2204 operate to provide one or more functions of a radio access node 2200 as described herein. In some embodiments, the function(s) are implemented in software that is stored, e.g., in the memory 2206 and executed by the one or more processors 2204.

Figure 23:
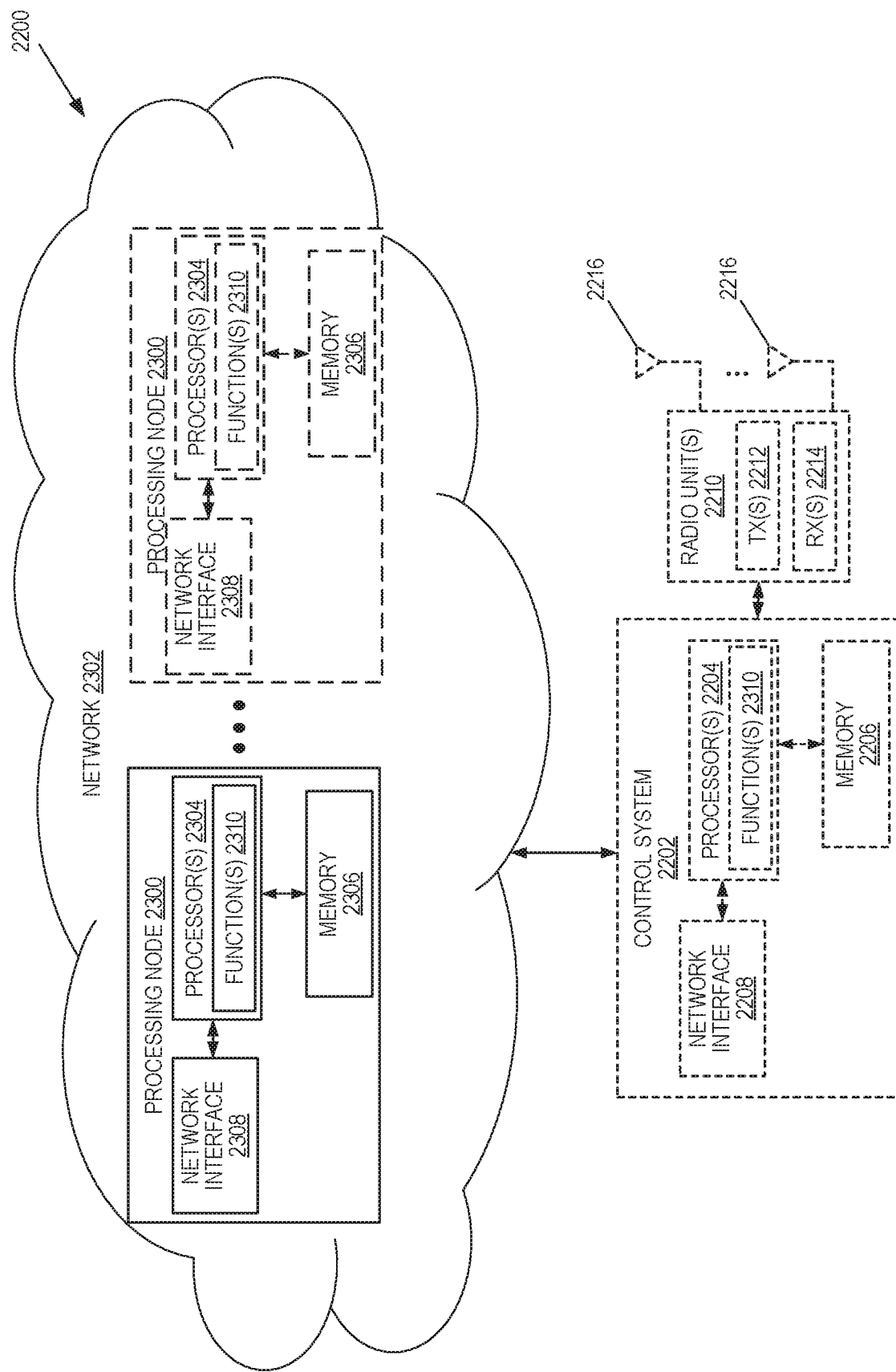
FIG. 23 is a schematic block diagram that illustrates a virtualized embodiment of the radio access node according to some embodiments of the present closure.

FIG. 23 is a schematic block diagram that illustrates a virtualized embodiment of the radio access node 2200 according to some embodiments of the present closure. This cussion is equally applicable to other types of network nodes. Further, other types of network nodes may have similar virtualized architectures. Again, optional features are represented by dashed boxes.

As used herein, a "virtualized" radio access node is an implementation of the radio access node 2200 in which at least a portion of the functionality of the radio access node 2200 is implemented as a virtual component(s) (e.g., via a virtual machine(s) executing on a physical processing node(s) in a network(s)). As illustrated, in this example, the radio access node 2200 may include the control system 2202 and/or the one or more radio units 2210, as described above. The control system 2202 may be connected to the radio unit(s) 2210 via, for example, an optical cable or the like. The radio access node 2200 includes one or more processing nodes 2300 coupled to or included as part of a network(s) 2302. If present, the control system 2202 or the radio unit(s) is connected to the processing node(s) 2300 via the network 2302. Each processing node 2300 includes one or more processors 2304 (e.g., CPUs, ASICs, FPGAs, and/or the like), memory 2306, and a network interface 2308.

In this example, functions 2310 of the radio access node 2200 described herein are implemented at the one or more processing nodes 2300 or tributed across the one or more processing nodes 2300 and the control system 2202 and/or the radio unit(s) 2210 in any desired manner. In some particular embodiments, some or all of the functions 2310 of the radio access node 2200 described herein are implemented as virtual components executed by one or more virtual machines implemented in a virtual environment(s) hosted by the processing node(s) 2300. As will be appreciated by one of ordinary skill in the art, additional signaling or communication between the processing node(s) 2300 and the control system 2202 is used in order to carry out at least some of the desired functions 2310. Notably, in some embodiments, the control system 2202 may not be included, in which case the radio unit(s) 2210 communicate directly with the processing node(s) 2300 via an appropriate network interface(s).

In some embodiments, a computer program including instructions which, when executed by at least one processor, causes the at least one processor to carry out the functionality of radio access node 2200 or a node (e.g., a processing node 2300) implementing one or more of the functions 2310 of the radio access node 2200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
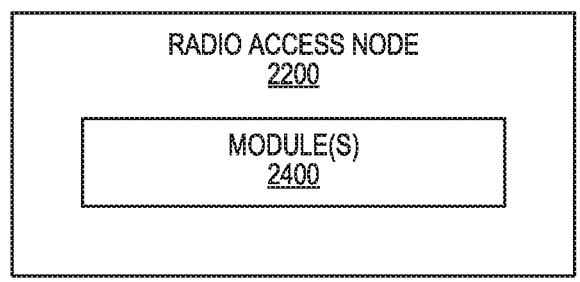
FIG. 24 is a schematic block diagram of the radio access node according to some other embodiments of the present closure.

FIG. 24 is a schematic block diagram of the radio access node 2200 according to some other embodiments of the present closure. The radio access node 2200 includes one or more modules 2400, each of which is implemented in software. The module(s) 2400 provide the functionality of the radio access node 2200 described herein. This cussion is equally applicable to the processing node 2300 of FIG. 23 where the modules 2400 may be implemented at one of the processing nodes 2300 or tributed across multiple processing nodes 2300 and/or tributed across the processing node(s) 2300 and the control system 2202.

Figure 25:
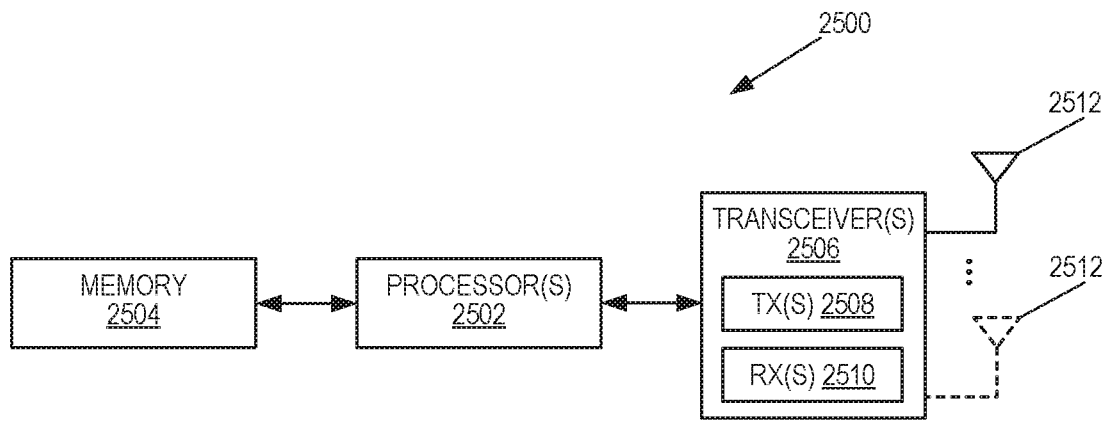
FIG. 25 is a schematic block diagram of a wireless communication device according to some embodiments of the present closure.

FIG. 25 is a schematic block diagram of a wireless communication device 2500 according to some embodiments of the present closure. As illustrated, the wireless communication device 2500 includes one or more processors 2502 (e.g., CPUs, ASICs, FPGAs, and/or the like), memory 2504, and one or more transceivers 2506 each including one or more transmitters 2508 and one or more receivers 2510 coupled to one or more antennas 2512. The transceiver(s) 2506 includes radio-front end circuitry connected to the antenna(s) 2512 that is configured to condition signals communicated between the antenna(s) 2512 and the processor(s) 2502, as will be appreciated by on of ordinary skill in the art. The processors 2502 are also referred to herein as processing circuitry. The transceivers 2506 are also referred to herein as radio circuitry. In some embodiments, the functionality of the wireless communication device 2500 described above may be fully or partially implemented in software that is, e.g., stored in the memory 2504 and executed by the processor(s) 2502. Note that the wireless communication device 2500 may include additional components not illustrated in FIG. 25 such as, e.g., one or more user interface components (e.g., an input/output interface including a play, buttons, a touch screen, a microphone, a speaker(s), and/or the like and/or any other components for allowing input of information into the wireless communication device 2500 and/or allowing output of information from the wireless communication device 2500), a power supply (e.g., a battery and associated power circuitry), etc.

In some embodiments, a computer program including instructions which, when executed by at least one processor, causes the at least one processor to carry out the functionality of the wireless communication device 2500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 26:
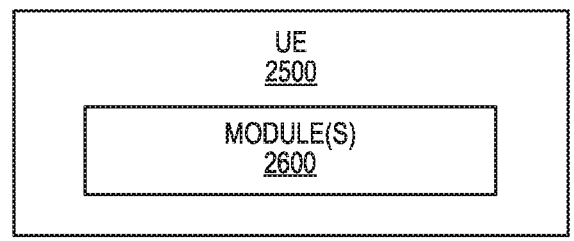
FIG. 26 is a schematic block diagram of the wireless communication device according to some other embodiments of the present closure.

FIG. 26 is a schematic block diagram of the wireless communication device 2500 according to some other embodiments of the present closure. The wireless communication device 2500 includes one or more modules 2600, each of which is implemented in software. The module(s) 2600 provide the functionality of the wireless communication device 2500 described herein.

Figure 27:
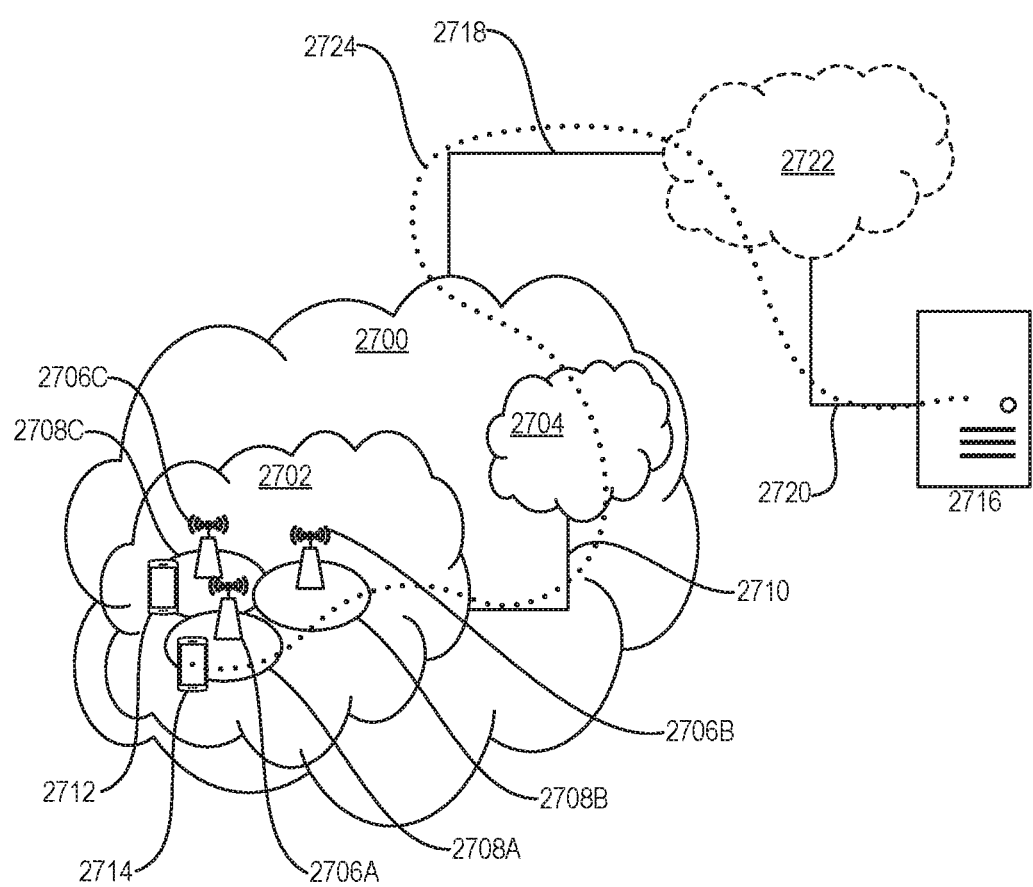
FIG. 27, in accordance with an embodiment, a communication system includes a telecommunication network, such as a 3GPP-type cellular network, which comprises an access network, such as a RAN, and a core network according to some other embodiments of the present closure.

With reference to FIG. 27, in accordance with an embodiment, a communication system includes a telecommunication network 2700, such as a 3GPP-type cellular network, which comprises an access network 2702, such as a RAN, and a core network 2704. The access network 2702 comprises a plurality of base stations 2706A, 2706B, 2706C, such as Node Bs, eNBs, gNBs, or other types of wireless Access Points (APs), each defining a corresponding coverage area 2708A, 2708B, 2708C. Each base station 2706A, 2706B, 2706C is connectable to the core network 2704 over a wired or wireless connection 2710. A first UE 2712 located in coverage area 2708C is configured to wirelessly connect to, or be paged by, the corresponding base station 2706C. A second UE 2714 in coverage area 2708A is wirelessly connectable to the corresponding base station 2706A. While a plurality of UEs 2712, 2714 are illustrated in this example, the closed embodiments are equally applicable to a situation where a sole UE is in the coverage area or where a sole UE is connecting to the corresponding base station 2706.

The telecommunication network 2700 is itself connected to a host computer 2716, which may be embodied in the hardware and/or software of a standalone server, a cloud-implemented server, a tributed server, or as processing resources in a server farm. The host computer 2716 may be under the ownership or control of a service provider, or may be operated by the service provider or on behalf of the service provider. Connections 2718 and 2720 between the telecommunication network 2700 and the host computer 2716 may extend directly from the core network 2704 to the host computer 2716 or may go via an optional intermediate network 2722. The intermediate network 2722 may be one of, or a combination of more than one of, a public, private, or hosted network; the intermediate network 2722, if any, may be a backbone network or the Internet; in particular, the intermediate network 2722 may comprise two or more sub-networks (not shown).

The communication system of FIG. 27 as a whole enables connectivity between the connected UEs 2712, 2714 and the host computer 2716. The connectivity may be described as an Over-the-Top (OTT) connection 2724. The host computer 2716 and the connected UEs 2712, 2714 are configured to communicate data and/or signaling via the OTT connection 2724, using the access network 2702, the core network 2704, any intermediate network 2722, and possible further infrastructure (not shown) as intermediaries. The OTT connection 2724 may be transparent in the sense that the participating communication devices through which the OTT connection 2724 passes are unaware of routing of uplink and downlink communications. For example, the base station 2706 may not or need not be informed about the past routing of an incoming downlink communication with data originating from the host computer 2716 to be forwarded (e.g., handed over) to a connected UE 2712. Similarly, the base station 2706 need not be aware of the future routing of an outgoing uplink communication originating from the UE 2712 towards the host computer 2716.

Example implementations, in accordance with an embodiment, of the UE, base station, and host computer cussed in the preceding paragraphs will now be described with reference to FIG. 28. In a communication system 2800, a host computer 2802 comprises hardware 2804 including a communication interface 2806 configured to set up and maintain a wired or wireless connection with an interface of a different communication device of the communication system 2800. The host computer 2802 further comprises processing circuitry 2808, which may have storage and/or processing capabilities. In particular, the processing circuitry 2808 may comprise one or more programmable processors, ASICs, FPGAs, or combinations of these (not shown) adapted to execute instructions. The host computer 2802 further comprises software 2810, which is stored in or accessible by the host computer 2802 and executable by the processing circuitry 2808. The software 2810 includes a host application 2812. The host application 2812 may be operable to provide a service to a remote user, such as a UE 2814 connecting via an OTT connection 2816 terminating at the UE 2814 and the host computer 2802. In providing the service to the remote user, the host application 2812 may provide user data which is transmitted using the OTT connection 2816.

The communication system 2800 further includes a base station 2818 provided in a telecommunication system and comprising hardware 2820 enabling it to communicate with the host computer 2802 and with the UE 2814. The hardware 2820 may include a communication interface 2822 for setting up and maintaining a wired or wireless connection with an interface of a different communication device of the communication system 2800, as well as a radio interface 2824 for setting up and maintaining at least a wireless connection 2826 with the UE 2814 located in a coverage area (not shown in FIG. 28) served by the base station 2818.

The communication interface 2822 may be configured to facilitate a connection 2828 to the host computer 2802. The connection 2828 may be direct or it may pass through a core network (not shown in FIG. 28) of the telecommunication system and/or through one or more intermediate networks outside the telecommunication system. In the embodiment shown, the hardware 2820 of the base station 2818 further includes processing circuitry 2830, which may comprise one or more programmable processors, ASICs, FPGAs, or combinations of these (not shown) adapted to execute instructions. The base station 2818 further has software 2832 stored internally or accessible via an external connection.

The communication system 2800 further includes the UE 2814 already referred to. The UE's 2814 hardware 2834 may include a radio interface 2836 configured to set up and maintain a wireless connection 2826 with a base station serving a coverage area in which the UE 2814 is currently located. The hardware 2834 of the UE 2814 further includes processing circuitry 2838, which may comprise one or more programmable processors, ASICs, FPGAs, or combinations of these (not shown) adapted to execute instructions. The UE 2814 further comprises software 2840, which is stored in or accessible by the UE 2814 and executable by the processing circuitry 2838. The software 2840 includes a client application 2842. The client application 2842 may be operable to provide a service to a human or non-human user via the UE 2814, with the support of the host computer 2802. In the host computer 2802, the executing host application 2812 may communicate with the executing client application 2842 via the OTT connection 2816 terminating at the UE 2814 and the host computer 2802. In providing the service to the user, the client application 2842 may receive request data from the host application 2812 and provide user data in response to the request data. The OTT connection 2816 may transfer both the request data and the user data. The client application 2842 may interact with the user to generate the user data that it provides.

Figure 28:
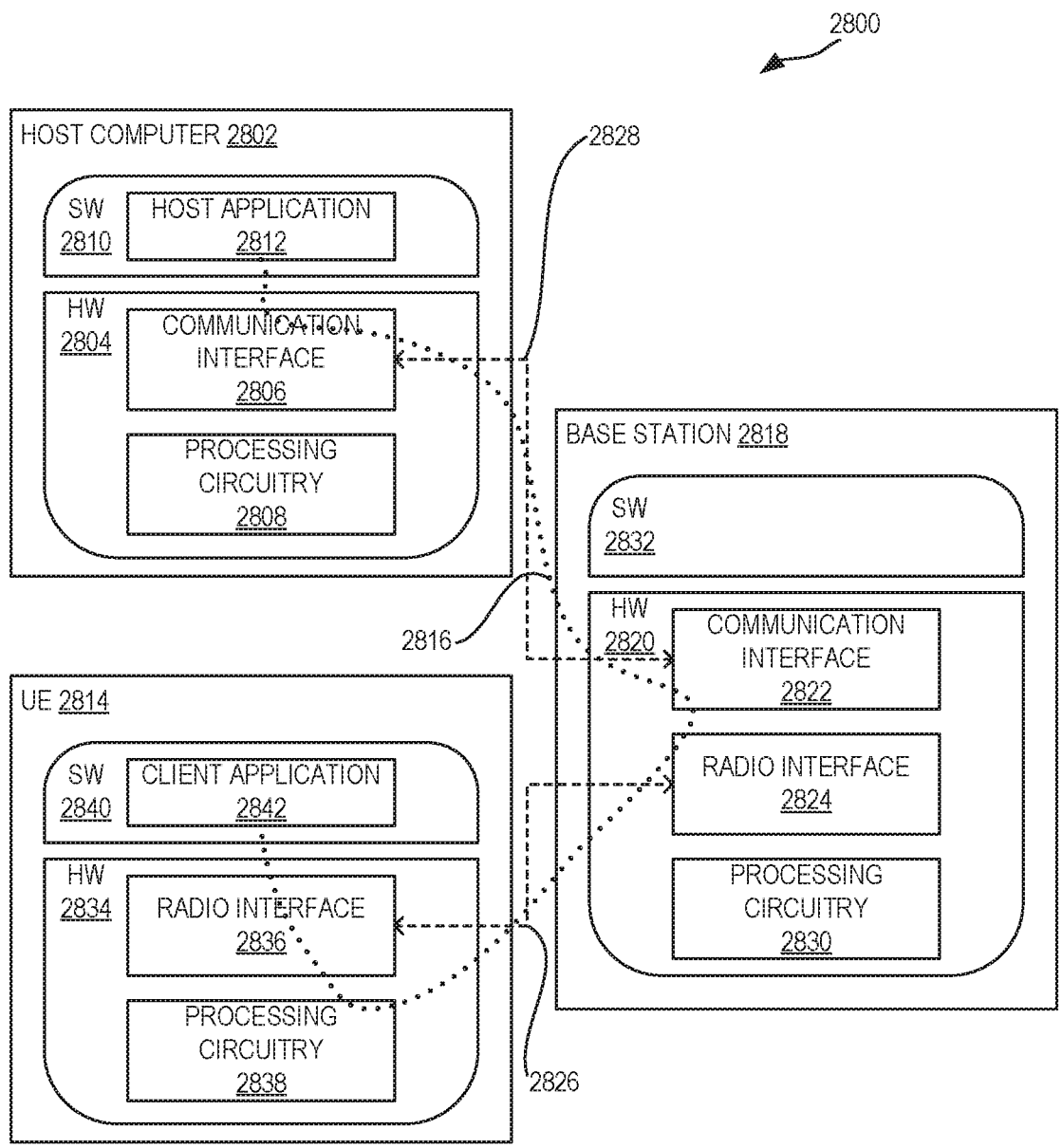
FIG. 28 illustrates an example implementation, in accordance with an embodiment, of the UE, base station, and host computer according to some other embodiments of the present closure.

It is noted that the host computer 2802, the base station 2818, and the UE 2814 illustrated in FIG. 28 may be similar or identical to the host computer 2716, one of the base stations 2706A, 2706B, 2706C, and one of the UEs 2712, 2714 of FIG. 27, respectively. This is to say, the inner workings of these entities may be as shown in FIG. 28 and independently, the surrounding network topology may be that of FIG. 27.

In FIG. 28, the OTT connection 2816 has been drawn abstractly to illustrate the communication between the host computer 2802 and the UE 2814 via the base station 2818 without explicit reference to any intermediary devices and the precise routing of messages via these devices. The network infrastructure may determine the routing, which may be configured to hide from the UE 2814 or from the service provider operating the host computer 2802, or both. While the OTT connection 2816 is active, the network infrastructure may further take decisions by which it dynamically changes the routing (e.g., on the basis of load balancing consideration or reconfiguration of the network).

The wireless connection 2826 between the UE 2814 and the base station 2818 is in accordance with the teachings of the embodiments described throughout this closure. One or more of the various embodiments improve the performance of OTT services provided to the UE 2814 using the OTT connection 2816, in which the wireless connection 2826 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2816 between the host computer 2802 and the UE 2814, in response to variations in the measurement results. The measurement procedure and/or the network functionality for reconfiguring the OTT connection 2816 may be implemented in the software 2810 and the hardware 2804 of the host computer 2802 or in the software 2840 and the hardware 2834 of the UE 2814, or both. In some embodiments, sensors (not shown) may be deployed in or in association with communication devices through which the OTT connection 2816 passes; the sensors may participate in the measurement procedure by supplying values of the monitored quantities exemplified above, or supplying values of other physical quantities from which the software 2810, 2840 may compute or estimate the monitored quantities. The reconfiguring of the OTT connection 2816 may include message format, retransmission settings, preferred routing, etc.; the reconfiguring need not affect the base station 2818, and it may be unknown or imperceptible to the base station 2818. Such procedures and functionalities may be known and practiced in the art. In certain embodiments, measurements may involve proprietary UE signaling facilitating the host computer 2802's measurements of throughput, propagation times, latency, and the like. The measurements may be implemented in that the software 2810 and 2840 causes messages to be transmitted, in particular empty or 'dummy' messages, using the OTT connection 2816 while it monitors propagation times, errors, etc.

Figures 29, 30:
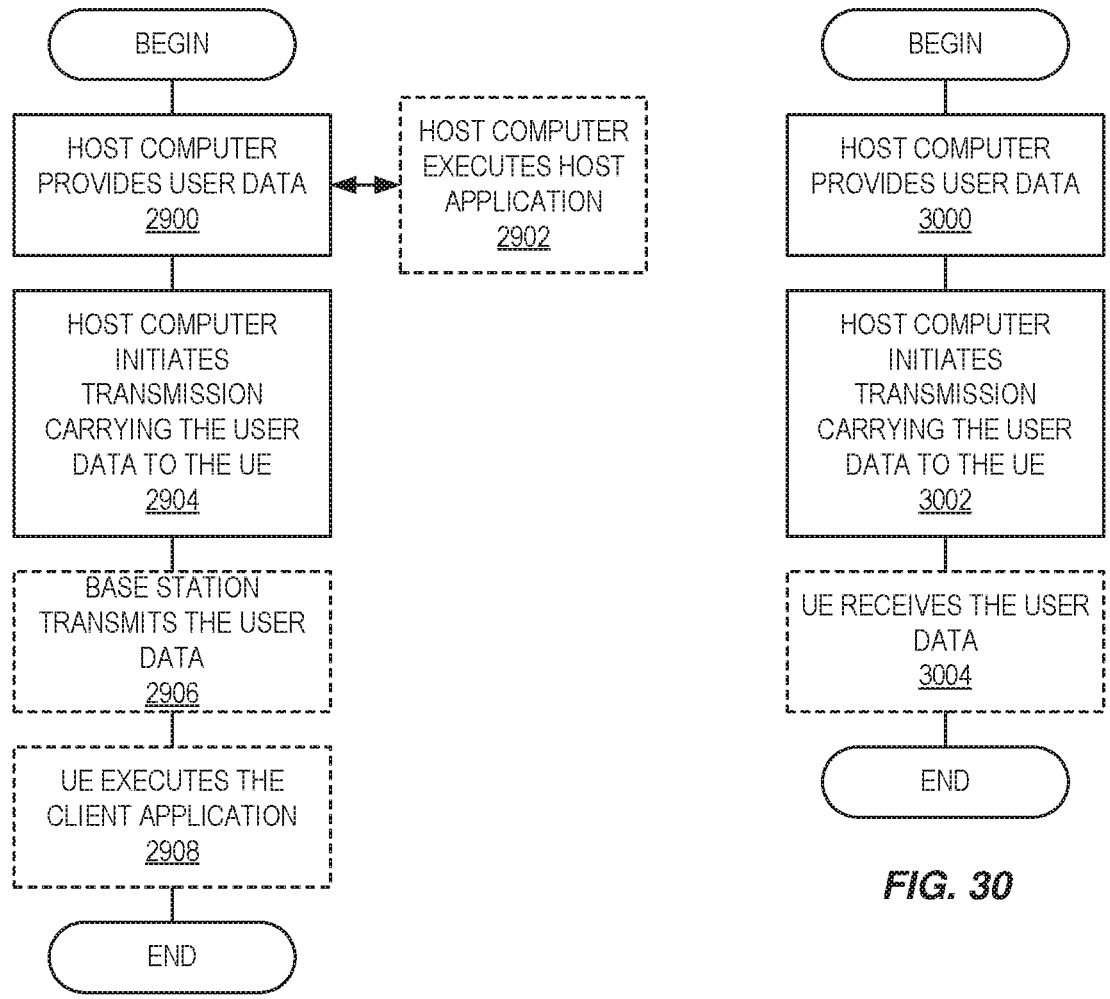
FIG. 29 is a flowchart illustrating a method implemented in a communication system, in accordance with one embodiment.
FIG. 30 is a flowchart illustrating a method implemented in a communication system, in accordance with one embodiment.

FIG. 29 is a flowchart illustrating a method implemented in a communication system, in accordance with one embodiment. The communication system includes a host computer, a base station, and a UE which may be those described with reference to FIGS. 27 and 28. For simplicity of the present closure, only drawing references to FIG. 29 will be included in this section. In step 2900, the host computer provides user data. In sub-step 2902 (which may be optional) of step 2900, the host computer provides the user data by executing a host application. In step 2904, the host computer initiates a transmission carrying the user data to the UE. In step 2906 (which may be optional), the base station transmits to the UE the user data which was carried in the transmission that the host computer initiated, in accordance with the teachings of the embodiments described throughout this closure. In step 2908 (which may also be optional), the UE executes a client application associated with the host application executed by the host computer.

FIG. 30 is a flowchart illustrating a method implemented in a communication system, in accordance with one embodiment. The communication system includes a host computer, a base station, and a UE which may be those described with reference to FIGS. 27 and 28. For simplicity of the present closure, only drawing references to FIG. 30 will be included in this section. In step 3000 of the method, the host computer provides user data. In an optional sub-step (not shown) the host computer provides the user data by executing a host application. In step 3002, the host computer initiates a transmission carrying the user data to the UE. The transmission may pass via the base station, in accordance with the teachings of the embodiments described throughout this closure. In step 3004 (which may be optional), the UE receives the user data carried in the transmission.

Figures 31, 32:
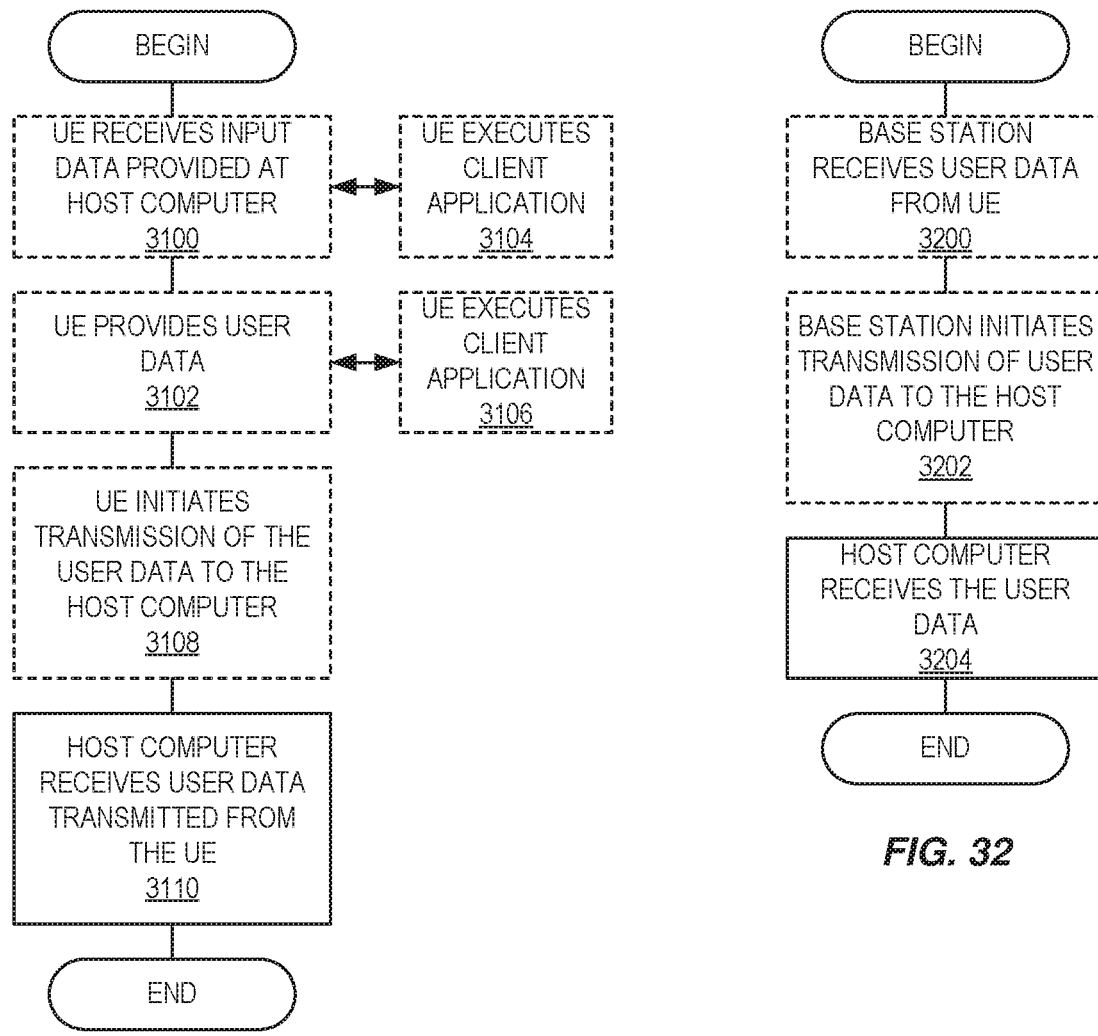
FIG. 31 is a flowchart illustrating a method implemented in a communication system, in accordance with one embodiment.
FIG. 32 is a flowchart illustrating a method implemented in a communication system, in accordance with one embodiment.

FIG. 31 is a flowchart illustrating a method implemented in a communication system, in accordance with one embodiment. The communication system includes a host computer, a base station, and a UE which may be those described with reference to FIGS. 27 and 28. For simplicity of the present closure, only drawing references to FIG. 31 will be included in this section. In step 3100 (which may be optional), the UE receives input data provided by the host computer. Additionally or alternatively, in step 3102, the UE provides user data. In sub-step 3104 (which may be optional) of step 3100, the UE provides the user data by executing a client application. In sub-step 3106 (which may be optional) of step 3102, the UE executes a client application which provides the user data in reaction to the received input data provided by the host computer. In providing the user data, the executed client application may further consider user input received from the user. Regardless of the specific manner in which the user data was provided, the UE initiates, in sub-step 3108 (which may be optional), transmission of the user data to the host computer. In step 3110 of the method, the host computer receives the user data transmitted from the UE, in accordance with the teachings of the embodiments described throughout this closure.

FIG. 32 is a flowchart illustrating a method implemented in a communication system, in accordance with one embodiment. The communication system includes a host computer, a base station, and a UE which may be those described with reference to FIGS. 27 and 28. For simplicity of the present closure, only drawing references to FIG. 32 will be included in this section. In step 3200 (which may be optional), in accordance with the teachings of the embodiments described throughout this closure, the base station receives user data from the UE. In step 3202 (which may be optional), the base station initiates transmission of the received user data to the host computer. In step 3204 (which may be optional), the host computer receives the user data carried in the transmission initiated by the base station.

Any appropriate steps, methods, features, functions, or benefits closed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present closure.

While processes in the figures may show a particular order of operations performed by certain embodiments of the present closure, it should be understood that such order is exemplary (e.g., alternative embodiments may perform the operations in a different order, combine certain operations, overlap certain operations, etc.).

Embodiments

Group A Embodiments

Embodiment 1: A method performed by a wireless device for activating Transmission Configuration Indicator, TCI, states, the method comprising one or more of: being configured (1800) to monitor a plurality of Downlink Control Information, DCI, formats with the TCI field for Physical Downlink Shared Channel, PDSCH, reception; receiving (1802) a single Medium Access Control, MAC, Control Element, CE, to activate TCI states and map activated TCI states to the TCI field codepoints of the plurality of DCI formats; and receiving (1804) separate MAC CEs to activate TCI states and map activated TCI states to the TCI field codepoints of each of the plurality of DCI formats.

Embodiment 2: The method of embodiment 1 wherein one or more of the plurality of DCI formats are DCI format 1_1 and/or 1_2.

Embodiment 3: The method of any of embodiments 1 to 2 wherein using a single MAC CE to activate TCI states and map activated TCI states to the TCI field codepoints of the plurality of DCI formats comprises using the mappings for a subset of TCI field codepoints in one DCI format to the TCI field codepoints in another DCI format.

Embodiment 4: The method of embodiment 3 wherein the activated TCI states mapped to the first S TCI field codepoints in DCI format 1_1 are mapped to the TCI field codepoints in DCI format 1_2, wherein S is, e.g., the number of codepoints in the TCI field of DCI format 1_2:

Embodiment 5: The method of embodiment 3 wherein the activated TCI states mapped to TCI field codepoints $S_0+1$ to $S_0+S$ in DCI format 1_1 are mapped to the TCI field codepoints in DCI format 1_2, wherein S is, e.g., the number of codepoints in the TCI field of DCI format 1_2 and $S_0$ is, e.g., either a pre-specified, fixed, or configurable value.

Embodiment 6: The method of any of embodiments 4 to 5 where S is determined from the higher layer parameter tci-PresentInDCI-ForDCI-Format1-2 as S=2 K where K can take on one value out of 1, 2, or 3 as configured by tci-PresentInDCI-ForDCI-Format1-2.

Embodiment 7: The method of any of embodiments 1 to 2 wherein using a single MAC CE to activate TCI states and map activated TCI states to the TCI field codepoints of the plurality of DCI formats includes one or more of: receiving TCI state mappings to a large number of codepoints than the number of codepoints in any of the plurality of DCI formats in the single MAC CE; using the mappings of a first subset of TCI field codepoints in the MAC CE to the TCI field codepoints of a first DCI format, and using the mappings of a second subset of TCI field codepoints in the MAC CE to the TCI field codepoints of a second DCI format.

Embodiment 8: The method of any of embodiments 1 to 7 wherein using a single MAC CE to activate TCI states and map activated TCI states to the TCI field codepoints of the plurality of DCI formats includes using a field in the MAC CE to indicate which DCI format among the plurality of DCI formats to which the TCI codepoint mapping applies to.

Embodiment 9: The method of any of embodiments 1 to 8 wherein using different MAC CEs to activate TCI states and map activated TCI states to the TCI field codepoints of the plurality of DCI formats.

Embodiment 10: The method of any of embodiments 1 to 9 wherein the default TCI state is defined as the TCI states corresponding to the lowest codepoint, among the TCI codepoints contained in the MAC CE, containing two different TCI states.

Embodiment 11: The method of any of embodiments 1 to 9 wherein the default TCI state is defined as the TCI states corresponding to the lowest codepoint, among the TCI codepoints contained in one of the different MAC CEs, containing two different TCI states.

Embodiment 12: The method of any of the previous embodiments, further comprising: providing user data; and forwarding the user data to a host computer via the transmission to the base station.

Group B Embodiments

Embodiment 13: A method performed by a base station for activating Transmission Configuration Indicator, TCI, states, the method comprising one or more of: configuring (1900) a wireless device to monitor a plurality of Downlink Control Information, DCI, formats with the TCI field for Physical Downlink Shared Channel, PDSCH, reception; transmitting (1902), to the wireless device, a single Medium Access Control, MAC, Control Element, CE, to activate TCI states and map activated TCI states to the TCI field codepoints of the plurality of DCI formats; and transmitting (1904), to the wireless device, separate MAC CEs to activate TCI states and map activated TCI states to the TCI field codepoints of each of the plurality of DCI formats.

Embodiment 14: The method of embodiment 13 wherein one or more of the plurality of DCI formats are DCI format 1_1 and/or 1_2.

Embodiment 15: The method of any of embodiments 13 to 14 wherein using a single MAC CE to activate TCI states and map activated TCI states to the TCI field codepoints of the plurality of DCI formats comprises using the mappings for a subset of TCI field codepoints in one DCI format to the TCI field codepoints in another DCI format.

Embodiment 16: The method of embodiment 15 wherein the activated TCI states mapped to the first S TCI field codepoints in DCI format 1_1 are mapped to the TCI field codepoints in DCI format 1_2, wherein S is, e.g., the number of codepoints in the TCI field of DCI format 1_2.

Embodiment 17: The method of embodiment 15 wherein the activated TCI states mapped to TCI field codepoints $S_0+1$ to $S_0+S$ in DCI format 1_1 are mapped to the TCI field codepoints in DCI format 1_2, wherein S is, e.g., the number of codepoints in the TCI field of DCI format 1_2 and $S_0$ is, e.g., either a pre-specified, fixed, or configurable value.

Embodiment 18: The method of any of embodiments 16 to 17 where S is determined from the higher layer parameter tci-PresentInDCI-ForDCI-Format1-2 as S=2 K where K can take on one value out of 1, 2, or 3 as configured by tci-PresentInDCI-ForDCI-Format1-2.

Embodiment 19: The method of any of embodiments 13 to 14 wherein using a single MAC CE to activate TCI states and map activated TCI states to the TCI field codepoints of the plurality of DCI formats includes one or more of: receiving TCI state mappings to a large number of codepoints than the number of codepoints in any of the plurality of DCI formats in the single MAC CE; using the mappings of a first subset of TCI field codepoints in the MAC CE to the TCI field codepoints of a first DCI format, and using the mappings of a second subset of TCI field codepoints in the MAC CE to the TCI field codepoints of a second DCI format.

Embodiment 20: The method of any of embodiments 13 to 19 wherein using a single MAC CE to activate TCI states and map activated TCI states to the TCI field codepoints of the plurality of DCI formats includes using a field in the MAC CE to indicate which DCI format among the plurality of DCI formats to which the TCI codepoint mapping applies to.

Embodiment 21: The method of any of embodiments 13 to 20 wherein using different MAC CEs to activate TCI states and map activated TCI states to the TCI field codepoints of the plurality of DCI formats.

Embodiment 22: The method of any of embodiments 13 to 21 wherein the default TCI state is defined as the TCI states corresponding to the lowest codepoint, among the TCI codepoints contained in the MAC CE, containing two different TCI states.

Embodiment 23: The method of any of embodiments 13 to 22 wherein the default TCI state is defined as the TCI states corresponding to the lowest codepoint, among the TCI codepoints contained in one of the different MAC CEs, containing two different TCI states.

Embodiment 24: The method of any of the previous embodiments, further comprising: obtaining user data; and forwarding the user data to a host computer or a wireless device.

Group C Embodiments

Embodiment 25: A wireless device for activating Transmission Configuration Indicator, TCI, states, the wireless device comprising: processing circuitry configured to perform any of the steps of any of the Group A embodiments; and power supply circuitry configured to supply power to the wireless device.

Embodiment 26: A base station for activating Transmission Configuration Indicator, TCI, states, the base station comprising: processing circuitry configured to perform any of the steps of any of the Group B embodiments; and power supply circuitry configured to supply power to the base station.

Embodiment 27: A User Equipment, UE, for activating Transmission Configuration Indicator, TCI, states, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 28: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 29: The communication system of the previous embodiment further including the base station.

Embodiment 30: The communication system of the previous 2 embodiments, further including the UE, wherein the UE is configured to communicate with the base station.

Embodiment 31: The communication system of the previous 3 embodiments, wherein: the processing circuitry of the host computer is configured to execute a host application, thereby providing the user data; and the UE comprises processing circuitry configured to execute a client application associated with the host application.

Embodiment 32: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 33: The method of the previous embodiment, further comprising, at the base station, transmitting the user data.

Embodiment 34: The method of the previous 2 embodiments, wherein the user data is provided at the host computer by executing a host application, the method further comprising, at the UE, executing a client application associated with the host application.

Embodiment 35: A User Equipment, UE, configured to communicate with a base station, the UE comprising a radio interface and processing circuitry configured to perform the method of the previous 3 embodiments.

Embodiment 36: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 37: The communication system of the previous embodiment, wherein the cellular network further includes a base station configured to communicate with the UE.

Embodiment 38: The communication system of the previous 2 embodiments, wherein: the processing circuitry of the host computer is configured to execute a host application, thereby providing the user data; and the UE's processing circuitry is configured to execute a client application associated with the host application.

Embodiment 39: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 40: The method of the previous embodiment, further comprising at the UE, receiving the user data from the base station.

Embodiment 41: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 42: The communication system of the previous embodiment, further including the UE.

Embodiment 43: The communication system of the previous 2 embodiments, further including the base station, wherein the base station comprises a radio interface configured to communicate with the UE and a communication interface configured to forward to the host computer the user data carried by a transmission from the UE to the base station.

Embodiment 44: The communication system of the previous 3 embodiments, wherein: the processing circuitry of the host computer is configured to execute a host application; and the UE's processing circuitry is configured to execute a client application associated with the host application, thereby providing the user data.

Embodiment 45: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 46: A method implemented in a communication system including a host computer, a base station, and a User Equipment, UE, the method comprising: at the host computer, receiving user data transmitted to the base station from the UE, wherein the UE performs any of the steps of any of the Group A embodiments Embodiment 47: The method of the previous embodiment, further comprising, at the UE, providing the user data to the base station.

Embodiment 48: The method of the previous 2 embodiments, further comprising: at the UE, executing a client application, thereby providing the user data to be transmitted; and at the host computer, executing a host application associated with the client application.

Embodiment 49: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 50: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 51: The communication system of the previous embodiment further including the base station.

Embodiment 52: The communication system of the previous 2 embodiments, further including the UE, wherein the UE is configured to communicate with the base station.

Embodiment 53: The communication system of the previous 3 embodiments, wherein: the processing circuitry of the host computer is configured to execute a host application; and the UE is configured to execute a client application associated with the host application, thereby providing the user data to be received by the host computer.

Embodiment 54: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 54: The method of the previous embodiment, further comprising at the base station, receiving the user data from the UE.

Embodiment 55: The method of the previous 2 embodiments, further comprising at the base station, initiating a transmission of the received user data to the host computer.

At least some of the following abbreviations may be used in this closure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station tributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present closure. All such improvements and modifications are considered within the scope of the concepts closed herein.

The invention claimed is:

1. A method performed by a wireless device for activating Transmission Configuration Indicator, TCI, states, the method comprising:
   being configured to monitor a plurality of Downlink Control Information, DCI, formats each with a TCI field for Physical Downlink Shared Channel, PDSCH, reception, wherein the TCI field of the plurality of DCI formats is configured with different sizes;
   receiving a single TCI state activation command to activate a plurality of TCI states and map the activated TCI states to a set of codepoints of the TCI field for the plurality of DCI formats, wherein at least one of the codepoints within the set of codepoints is mapped to two activated TCI states; and
   wherein, when a number of codepoints S of the TCI field of a DCI is smaller than a maximum number of codepoints provided in the single TCI state activation command, the S codepoints are mapped to first S codepoints in the single TCI state activation command.

2. The method of claim 1 wherein the single TCI state activation command is a Medium Access Control, MAC, Control Element, CE.

3. The method of claim 2, wherein using a single MAC CE to activate the plurality of TCI states and map the activated TCI states to the set of codepoints of the TCI field for the plurality of DCI formats includes:
   receiving TCI state mappings to a larger number of codepoints than the number of the codepoints of the TCI field in any of the plurality of DCI formats in the MAC CE;
   using mappings of a first subset of the TCI field codepoints in the MAC CE to the TCI field codepoints of a first DCI format, and using the mappings of a second subset of the TCI field codepoints in the MAC CE to the TCI field codepoints of a second DCI format.

4. The method of claim 1 wherein one or more of the plurality of DCI formats are DCI formats and/or 1_2.

5. The method of claim 1, wherein receiving the single TCI state activation command to activate the plurality of TCI states and map the activated TCI states to the set of codepoints of the TCI field for the plurality of DCI formats comprises using a subset of the mappings for DCI formats having a TCI field with a smaller number of codepoints than the set of codepoints provided by the single TCI state activation command.

6. The method of claim 1 wherein, when the single TCI state activation command is used for TCI state activation/deactivation for both DCI formats 1_1 and 1_2, default TCI states are TCI states corresponding to a lowest codepoint among TCI codepoints contained in the single TCI state activation command, containing two different TCI states.

7. The method of claim 1 where S is determined from a higher layer parameter tci-PresentInDCI-ForDCI-Format1-2 as $S=2^K$ where K can take on one value out of 1, 2, or 3 as configured by tci-PresentInDCI-ForDCI-Formatl-2.

8. The method of claim 1, wherein using the MAC CE to activate the TCI states and map the activated TCI states to the TCI field codepoints of the plurality of DCI formats includes using a field in the MAC CE to indicate which DCI format among the plurality of DCI formats to which the TCI codepoint mapping applies to.

9. The method of claim 1 further comprising: receiving separate TCI state activation commands to activate the plurality of TCI states and map the activated TCI states to the set of codepoints of the TCI field for each of the plurality of DCI formats, wherein the at least one of the codepoints within the set of codepoints is mapped to the two activated TCI states, wherein receiving the separate TCI state activation commands to activate the TCI states and map the activated TCI states to the TCI field codepoints for the plurality of DCI formats comprises receiving one MAC CE activation command for each of the plurality of DCI formats to activate the plurality of TCI states and map the activated TCI states to the set of codepoints of the TCI field of the DCI format.

10. The method of claim 1, wherein the default TCI state is defined as the TCI states corresponding to a lowest codepoint among the TCI codepoints contained in the MAC CE containing two different TCI states.

11. The method of claim 1, wherein the default TCI state is defined as the TCI states corresponding to a lowest codepoint among the TCI codepoints contained in one of the separate MAC CEs containing two different TCI states.

12. A method performed by a base station for activating Transmission Configuration Indicator, TCI, states, the method comprising:
   configuring a wireless device to monitor a plurality of Downlink Control Information, DCI, formats each with a TCI field for Physical Downlink Shared Channel, PDSCH, reception, wherein the TCI field of the plurality of DCI formats is configured with different sizes;
   transmitting, to the wireless device, a single TCI activation command to activate the TCI states and map the activated TCI states to TCI field codepoints for the plurality of DCI formats; and wherein, when a number of codepoints S of the TCI field of a DCI is smaller than a maximum number of codepoints provided in the single TCI state activation command, the S codepoints are mapped to first S codepoints in the single TCI state activation command.

13. The method of claim 12 wherein the single TCI activation command is a Medium Access Control, MAC, Control Element, CE.

14. The method of claim 13 wherein one or more of the plurality of DCI formats are DCI format 1_1 and/or 1_2.

15. The method of claim 12, wherein using the MAC CE to activate the TCI states and map the activated TCI states to the TCI field codepoints of the plurality of DCI formats comprises using the mappings for a subset of the TCI field codepoints in the activation command for a DCI format having a TCI field with a smaller number of codepoints than the set of codepoints provided by the single TCI activation command.

16. The method of claim 12, wherein, when the single TCI activation command is used for TCI state activation/deactivation for both DCI formats 1_1 and 1_2, default TCI states are the TCI states corresponding to a lowest codepoint, among the TCI codepoints contained in the single TCI activation command, containing two different TCI states.

17. The method of claim 12, where S is determined from a higher layer parameter tci-PresentInDCI-ForDCI-Format1-2 as $S=2^K$ where K can take on one value out of 1, 2, or 3 as configured by tci-PresentInDCI-ForDCI-Format1-2.

18. The method of claim 12, wherein using the MAC CE to activate the TCI states and map activated the TCI states to the codepoints of the TCI field for the plurality of DCI formats includes:
  transmitting TCI state mappings to a larger number of codepoints than the number of codepoints of the TCI field in any of the plurality of DCI formats in the MAC CE;
  using the mappings of a first subset of the TCI field codepoints in the MAC CE to the TCI field codepoints of a first DCI format, and
  using the mappings of a second subset of the TCI field codepoints in the MAC CE to the TCI field codepoints of a second DCI format.

19. The method of claim 12, wherein using the MAC CE to activate the TCI states and map the activated TCI states to the TCI field codepoints for the plurality of DCI formats includes using a field in the MAC CE to indicate which DCI format among the plurality of DCI formats to which the TCI codepoint mapping applies to.

20. The method of claim 12, wherein using separate MAC CEs to activate the TCI states and map the activated TCI states to the TCI field codepoints for the plurality of DCI formats comprises receiving one MAC CE activation command for each of the plurality of DCI formats to activate a plurality of TCI states and map the activated TCI states to a set of codepoints of the TCI field of the DCI format.

21. The method of claim 12, wherein the default TCI state is defined as the TCI states corresponding to a lowest codepoint, among the TCI codepoints contained in the MAC CE, containing two different TCI states.

22. The method of claim 12, wherein the default TCI state is defined as the TCI states corresponding to a lowest codepoint, among the TCI codepoints contained in one of the separate MAC CEs, containing two different TCI states.

23. A wireless device for activating Transmission Configuration Indicator, TCI, states comprising:
  one or more transmitters;
  one or more receivers; and
  processing circuitry associated with the one or more transmitters and the one or more receivers, the processing circuitry configured to cause the wireless device to:
  be configured to monitor a plurality of Downlink Control Information, DCI, formats each with a TCI field for Physical Downlink Shared Channel, PDSCH, reception, wherein the TCI field of the plurality of DCI formats may be configured with different sizes;
  receive a single TCI state activation command to activate a plurality of the TCI states and map the activated TCI states to a set of codepoints of the TCI field for the plurality of DCI formats, wherein at least one of the codepoints within the set of codepoints is mapped to two activated TCI states; and
  wherein, when a number of codepoints S of the TCI field of a DCI is smaller than a maximum number of codepoints provided in the single TCI state activation command, the S codepoints are mapped to first S codepoints in the single TCI state activation command.

24. A base station for activating Transmission Configuration Indicator, TCI, states, comprising:
  one or more transmitters;
  one or more receivers; and
  processing circuitry associated with the one or more transmitters and the one or more receivers, the processing circuitry configured to cause the base station to perform:
  configure a wireless device to monitor a plurality of Downlink Control Information, DCI, formats each with a TCI field for Physical Downlink Shared Channel, PDSCH, reception, wherein the TCI field of the plurality of DCI formats is configured with different sizes;
  transmit, to the wireless device, a single TCI activation command to activate the TCI states and map the activated TCI states to the TCI field codepoints of the plurality of DCI formats; and
  wherein, when a number of codepoints S of the TCI field of a DCI is smaller than a maximum number of codepoints provided in the single TCI state activation command, the S codepoints are mapped to first S codepoints in the single TCI state activation command.

* * * * *